US012747830B2

(12) United States Patent
Cohen et al.

(10) Patent No.: US 12,747,830 B2
(45) Date of Patent: Sep. 29, 2026

(54) APPARATUS, CONTROL SYSTEM AND PROCESS FOR RAPID FUEL DISPENSING

(71) Applicant: Air Products and Chemicals, Inc., Allentown, PA (US)

(72) Inventors: Joseph P. Cohen, Bethlehem, PA (US); Peter John Newboult, Guildford (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 331 days.

(21) Appl. No.: 18/644,635

(22) Filed: Apr. 24, 2024

(65) Prior Publication Data

US 2025/0332910 A1 Oct. 30, 2025

(51) Int. Cl.
*F17C 5/06* (2006.01)

(52) U.S. Cl.
CPC ...................................... *F17C 5/06* (2013.01)

(58) Field of Classification Search
CPC ...... F17C 2227/0369; F17C 2227/0386; F17C 2227/0339; F17C 2221/012; F17C 2265/065; F17C 2250/0439
See application file for complete search history.

(56) References Cited

U.S. PATENT DOCUMENTS 5,107,906 A 4/1992 Swenson et al.
5,934,081 A 8/1999 Notaro et al.
6,401,767 B1 6/2002 Cohen et al.
6,619,336 B2 9/2003 Cohen et al.
6,708,573 B1 3/2004 Cohen et al.
6,745,801 B1 6/2004 Cohen et al.
6,786,245 B1 9/2004 Eichelberger et al.
7,028,724 B2 4/2006 Cohen et al.
7,328,726 B2 2/2008 Cohen et al.
7,793,675 B2 9/2010 Cohen et al.
7,921,883 B2 4/2011 Cohen et al.
8,020,589 B2 9/2011 Cohen et al.
8,286,675 B2 10/2012 Farese et al.
8,365,777 B2 2/2013 Farese et al.
8,453,682 B2 6/2013 Bonner et al.
8,899,278 B2 12/2014 Cohen et al.
(Continued)

FOREIGN PATENT DOCUMENTS

AU 2023201317 A1 9/2023
EP 0933583 A2 4/1999
JP 2012167767 A 9/2012

*Primary Examiner* — Timothy P. Kelly
(74) *Attorney, Agent, or Firm* — Matthew R. Weaver

(57) ABSTRACT

An apparatus for fuel dispensing and a process for fuel dispensing can be configured to facilitate rapid fueling. In some embodiments, at least one compressor can be cooled down via sequential adjustment for venting to facilitate improved compressor and supply line cool down that can utilize less vented gas and also help improve the speed at which a sufficient cool down can be provided. Some embodiments can alternatively (or also) utilize a sequential supply line utilization scheme for feeding fuel from a cooled down and operational compressor to a dispenser for feeding to a fuel tank. A control system can be configured to oversee operation and control adjustment of how supply lines are utilized based on at least one pre-determined control scheme for venting and/or fueling via the supply line(s) as well.

20 Claims, 3 Drawing Sheets

(56) References Cited

U.S. PATENT DOCUMENTS

| | | | |
|---|---|---|---|
| 9,074,730 B2 | 7/2015 | Cohen | |
| 9,151,448 B2 | 10/2015 | Cohen et al. | |
| 9,261,238 B2 | 2/2016 | Cohen et al. | |
| 9,279,541 B2 | 3/2016 | Cohen | |
| 9,404,620 B2 | 8/2016 | Cohen | |
| 9,863,583 B2 | 1/2018 | Youlio et al. | |
| 10,502,649 B1 | 12/2019 | Cohen | |
| 10,508,770 B2 | 12/2019 | Cohen et al. | |
| 10,961,109 B2 | 3/2021 | Li et al. | |
| 11,009,185 B2 | 5/2021 | Li et al. | |
| 11,287,087 B2 | 3/2022 | Werlen et al. | |
| 11,506,340 B1 * | 11/2022 | Sleiman .................... | F17C 9/04 |
| 2023/0400154 A1 | 12/2023 | Cordova et al. | |

* cited by examiner

APPARATUS, CONTROL SYSTEM AND PROCESS FOR RAPID FUEL DISPENSING

FIELD OF THE INVENTION

The present innovation relates to processes and apparatuses that can facilitate more rapid fuel dispensing.

BACKGROUND OF THE INVENTION

Examples of hydrogen generation and supply systems can be appreciated from U.S. Pat. Nos. 6,401,767, 6,619,336, 6,708,573, 6,745,801, 6,786,245, 7,028,724, 7,328,726, 7,793,675, 7,921,883, 8,020,589, 8,286,675, 8,365,777, 8,453,682, 8,899,278, 9,074,730, 9,151,448, 9,261,238, 9,279,541, 9,404,620, 9,863,583, 10,502,649, and 10,508,770.

SUMMARY OF THE INVENTION

We have determined that fueling systems that can utilize a fuel stored in a tank in a liquid form for subsequently being fed to one or more vehicle fuel tanks in a gaseous form can often have slow start-up times for fueling that is due to cooling of supply lines and/or other fuel supply elements. For example, we determined that compressor start-up operations can often take a longer than desired time due to the time it may take for a compressor to be pre-cooled for operation to support fueling of at least one vehicle fuel tank. As another example, we determined that long supply lines can pose other challenges to providing sufficient pre-cooling for fueling operations, which may delay the initiation of fueling.

Hydrogen fueling systems can be configured to provide hydrogen in gaseous form to a vehicle fuel tank via at least one dispenser. Hydrogen fueling systems are examples of systems that may store the fuel (e.g. a fuel that includes hydrogen, a fuel that that is between 99 volume percent hydrogen and 100 volume percent hydrogen, etc.) in a liquid form in a tank for providing the fuel to at least one vehicle fuel tank via a dispenser that is connected to one or more fuel supply lines.

We have also determined that the fueling process and pre-cooling of supply elements for fueling can be slowed as well as requiring use of a significant amount of cold fuel for the pre-cooling that may be vented, and thus lost. This type of issue can result in a significant loss of fuel, which is undesired. These types of issues can be exacerbated in situations where fueling may involve use of multiple supply lines for providing the fuel to a dispenser and/or use of long supply lines.

Also, we have determined that it can be desired to limit or avoid use of heat transfer fluids or associated complexities and costs associated with cooling circuits that may be utilized for pre-cooling of fuel supply equipment. We have determined that such pre-cooling systems can incur significant capital cost and operational cost, increase the footprint of equipment for a fueling station, and incur other costs and problems that can reduce operational flexibility and design flexibility.

Embodiments of our apparatus for fuel dispensing, process for fuel dispensing, and control system for fuel dispensing can be configured to help address such problems. Some embodiments can be provided so that there may not be a need to utilize any type of heat transfer fluids or associated complexities and costs associated with cooling circuits that may be utilized for pre-cooling of fuel supply equipment. Instead, only the stored fuel itself may be utilized as the pre-cooling cooling fluid.

Also, embodiments can be configured to facilitate cool-down of a compressor as well as other supply equipment in a way that can utilize substantially less fuel while also providing quick cooling down of a compressor and related supply equipment for fueling operations. We have determined that some embodiments can provide a reduction in venting of fuel for pre-cooling by as much as 90%, for example.

Also, embodiments can be configured to facilitate use of multiple supply lines for providing fuel to a dispenser to facilitate quick or rapid fueling while also facilitating reduced use of fuel for pre-cooling operations. In some embodiments, the supply lines can be opened sequentially during fueling to account for the greater tolerance for a higher pressure drop in the supply of the fuel to a vehicle fuel tank that can occur when the fuel tank is less full (e.g. the lower pressure of an emptier fuel tank as compared to a higher pressure a fuller fuel tank may have). We have determined that this larger pressure drop can be accommodated at the initiation of fueling because an emptier vehicle fuel tank has a lower pressure (e.g. because there is less fuel in the fuel tank) and that a larger pressure drop that may occur via use of sequential supply line opening can therefore be accommodated without significant detriment to the fueling process or speed of the fueling. The sequential opening of the supply lines can be performed in a way that the closed supply lines do not have to undergo pre-cooling after being opened for providing an additional route for feeding the fuel to a dispenser, while also reducing a pressure drop that can be incurred via the fueling process to account for the fuel tank being filled during the fueling process. Embodiments can be adapted to facilitate use of very long supply lines and/or use of numerous supply lines (e.g. at least 4 supply lines, more than 8 supply lines, between 4 and 20 supply lines, etc.).

Embodiments can be configured for use in conjunction with fueling that may utilize hydrogen as the fuel or other fuel source (e.g. it is contemplated that another fuel that may be stored as a liquid and subsequently vaporized for fueling of a vehicle may be utilized instead of hydrogen). In such configurations, the stored fuel can be stored in a liquid state and can subsequently be fed to a dispenser for being dispensed into a fuel tank as a gas. In some embodiments, the pre-cooling process can be performed in between 5 seconds and 30 seconds so fueling via a dispenser can be started relatively promptly.

In a first aspect, a process to cool a compression system prior to operation of the compression system to feed fuel from a fuel storage tank to a dispenser can be provided. Embodiments of the process can include: (i) in response to detecting or predicting a demand for fuel at the dispenser, keeping a first vent valve of a first vent conduit closed and opening a second vent valve of a second vent conduit downstream of the first vent conduit so that fluid from the fuel storage tank is passable from the compression system to the second vent conduit while also bypassing a fueling heat exchanger positioned between the compression system and a dispenser feed conduit connect to the dispenser to cool the compression system; (ii) in response to determining that a temperature of the fluid adjacent the second vent valve is at a first pre-selected temperature threshold, closing the second vent valve and a bypass conduit and opening the first vent valve to stop venting of the fluid via the second vent conduit and initiate venting of the fluid via the first vent conduit; and (iii) in response to determining that the temperature of the fluid adjacent the second vent valve is at a second pre-selected temperature threshold that is higher than the first pre-selected temperature threshold, closing the first vent valve and opening the bypass conduit and opening the second vent valve to stop venting of the fluid via the first vent conduit and initiate venting of the fluid via the second vent conduit.

Embodiments of the process can utilize different types of automated process control elements to facilitate control and operation of the process. The process can also utilize other processing steps. In some embodiments, the fluid includes hydrogen (e.g. is a hydrogen gas or is a mix of hydrogen gas and liquid hydrogen). In such embodiments, the fuel of the fuel storage tank can include hydrogen (e.g. a stored liquid hydrogen that is to be fed to a vehicle via the dispenser as a hydrogen gas, etc.). The fuel can alternatively be another type of fuel in other embodiments.

The compression system can be configured to compress the fuel to a higher pressure. In some configurations, the compression system can include at least one compressor or at least one pump in some embodiments. In some configurations, the compression system can compress liquid hydrogen such that the output compressed fluid includes a mix of liquid hydrogen and gaseous hydrogen, which may be further heated and undergo further vaporization via the fueling heat exchanger.

In a second aspect, the process can also include closing of the first vent valve and/or the second vent valve and closing of the bypass conduit and subsequently starting the compression system for feeding of the fuel within the fuel storage tank to the fueling heat exchanger to vaporize the fuel to form gaseous fuel for feeding to the dispenser via the dispenser feed conduit in response to determining that the compression system is at or below a pre-selected compression system operational temperature threshold. For example, the closing of the first and second vent valves and the bypass conduit can occur after the compression system is determined to be at a sufficiently cold temperature to facilitate operation of the compression system, which can include at least one pump or at least one compressor. The starting to the compression system can also be initiated to feed the fuel of the storage tank (e.g. hydrogen) to a fueling heat exchanger for vaporizing the fuel for feeding the fuel to a dispenser.

In a third aspect, the process can also include feeding the gaseous fuel output from the fueling heat exchanger to one or more of a plurality of supply lines positioned between the fueling heat exchanger and the dispenser feed conduit. The supply lines can also be positioned between the bypass conduit and the dispenser feed conduit.

For example, the feeding of the gaseous fuel output from the fueling heat exchanger to the one or more of the plurality of supply lines can include initially feeding all of the gaseous fuel to a first supply line of the plurality of supply lines and subsequently opening at least one other supply line of the plurality of supply lines sequentially for passing the gaseous fuel to the dispenser feed conduit.

As another example, the feeding of the gaseous fuel output from the fueling heat exchanger to the one or more of the plurality of supply lines can include feeding the gaseous fuel to the first supply line of the plurality of supply lines for passing the gaseous fuel to the dispenser for dispensing to a fuel tank of a vehicle via the dispenser feed conduit connected to the supply lines. In response to determining that a temperature of the gaseous fuel being fed to the dispenser is at or below a first pre-selected fueling temperature, a second supply line of the plurality of supply lines can be opened to feed the gaseous fuel to the dispenser feed conduit via the first supply line and the second supply line. A temperature of the gaseous fuel fed to the dispenser can be increased above the first pre-selected fueling temperature after the second supply line is opened. The gaseous fuel output from the first supply line and the second supply line can be passed to the dispenser via the dispenser feed conduit after the temperature of the gaseous fuel was increased above the first pre-selected fueling temperature such that the temperature of the gaseous fuel is reduced to the first pre-selected fueling temperature.

In some embodiments, the feeding of the gaseous fuel output from the fueling heat exchanger to one or more of the plurality of supply lines can also include opening a third supply line of the plurality of supply lines to feed the gaseous fuel to the dispenser feed conduit via the first supply line, the second supply line, and the third supply line. A temperature of the gaseous fuel being fed to the dispenser can be increased above the first pre-selected fueling temperature after the third supply line is opened. The feeding of the gaseous fuel including the opening of the third supply line can occur after the opening of the second supply line has occurred and in response to determining that the temperature of the gaseous fuel being fed to the dispenser is at or below the first pre-selected fueling temperature.

Embodiments of the process can also include passing the gaseous fuel output from the first supply line, the second supply line, and the third supply line to the dispenser via the dispenser feed conduit after the third supply line was opened and the temperature of the gaseous fuel was increased above the first pre-selected fueling temperature such that the temperature of the gaseous fuel is reduced to the first pre-selected fueling temperature.

In some embodiments, the opening of the second supply line can include opening an inlet valve of the second supply line and opening an outlet valve of the second supply line. The inlet valve of the second supply line can be a modulating valve and/or the outlet valve of the second supply line can be a modulating valve in some implementations.

In a fourth aspect, the process of the first aspect can include one or more features of the second aspect and/or third aspect. Embodiments of the process can also include additional steps or features as well. Examples of such other features or steps can be appreciated from the discussion of exemplary embodiment provided herein, for instance.

In a fifth aspect, an apparatus for fueling a fuel tank of a vehicle is provided. Embodiments of the apparatus can include a fuel storage tank configured to store fuel therein, wherein the fuel that is stored in the fuel storage tank can include fuel in a liquid state. The stored fuel within the storage tank can also include vapor that may be formed during the storage of the liquid fuel in some embodiments. A compression system that is in fluid communication with the fuel storage tank can be positioned for pressurization of the fuel for outputting the fuel towards a dispenser configured to fill the fuel tank of the vehicle with the fuel. A fueling heat exchanger can be positioned and configured to vaporize the fuel output from the compression system; and a dispenser feed conduit can be positioned between the fueling heat exchanger and the dispenser for feeding the fuel in a gaseous state output from the fueling heat exchanger to the dispenser. A first vent conduit can be positioned between the compression system and the fueling heat exchanger and a second vent conduit can be connected to the dispenser feed conduit. A bypass conduit can be positioned between the compression system and the dispenser feed conduit so that fluid outputtable from the compression system is passable to the dispenser feed conduit while bypassing the fueling heat exchanger. A first temperature sensor can be positioned to determine a temperature of the compression system and a second temperature sensor can be positioned to determine a temperature of fluid adjacent to a second vent conduit or within the second vent conduit. A first controller having a processor communicatively connected to a non-transitory computer readable medium can also be provided. The first controller can be communicatively connected to the first temperature sensor, the second temperature sensor, a first vent valve of the first vent conduit, and a second vent valve of the second vent conduit. The first controller can be configured to detect a temperature of fluid adjacent the second vent valve being above a first pre-selected temperature threshold via data from the second temperature sensor while temperature data of the first temperature sensor indicates the temperature of the compression system is above a pre-selected compression system operational temperature while there is a demand for fuel at the dispenser and communicate with the first vent valve and the second vent valve to open the second vent valve and the bypass conduit to facilitate fluid from the fuel storage tank being passed through the compression system and subsequently passed to the second vent conduit for venting. The first controller can also be configured so that in response to determining that a temperature of the fluid adjacent the second vent valve is at the first pre-selected temperature threshold, the second vent valve is closed and the bypass conduit is closed and the first vent valve is opened to stop venting of the fluid via the second vent conduit and initiate venting of the fluid via the first vent conduit.

Embodiments of the apparatus can be configured to implement an embodiment of the process to cool a compression system prior to operation of the compression system to feed fuel from a fuel storage tank to a dispenser. The compression system can include at least one compressor and/or at least one pump. In some embodiments, the fuel can be hydrogen or can include hydrogen.

In a sixth aspect, the first controller can also be configured so that in response to determining that the temperature of the fluid adjacent the second vent valve is at a second pre-selected temperature threshold that is higher than the first pre-selected temperature threshold, the first vent valve is closed, a valve of the bypass conduit is opened and the second vent valve is opened to stop venting of the fluid via the first vent conduit and initiate venting of the fluid via the second vent conduit.

In a seventh aspect, the apparatus can include a plurality of supply lines positioned between the fueling heat exchanger and the dispenser feed conduit. The plurality of supply lines can also be positioned between the bypass conduit and the dispenser feed conduit. The plurality of supply lines can include first supply line and a second supply line. In some embodiments, the first supply line can have a larger capacity than the second supply line such that more fuel may be passable through the first supply line as compared to the second supply line. In other embodiments, the first supply line can have a smaller capacity than the second supply line such that less fuel may be passable through the first supply line as compared to the second supply line. In yet other embodiments, the first and second supply lines may have a similar capacity or the same capacity for conveying fuel.

In an eighth aspect, a second controller can be included in the apparatus. The second controller can have a processor communicatively connected to a non-transitory computer readable medium. The second controller can be communicatively connected to a third temperature sensor positioned to detect a temperature of gaseous fuel being fed to the dispenser and valves of the second supply line. The second controller can be configured to detect a temperature of the fuel in a gaseous state being fed to the dispenser via the first supply line based on temperature data received via the third temperature sensor and, in response to determining that the temperature of the gaseous fuel being fed to the dispenser via the first supply line is at or below a first pre-selected fueling temperature, communicate with valves of the second supply line to open the second supply line so the fuel in the gaseous state outputtable from the fueling heat exchanger is feedable to the dispenser feed conduit via the first supply line and the second supply line.

In some embodiments, the temperature of the fuel in the gaseous state being fed to the dispenser can be increasable to a second pre-selected fueling temperature that is higher than the first pre-selected fueling temperature after the second supply line is opened. The second controller can also be configured to determine that the temperature of the gaseous fuel is reduced to the first pre-selected fueling temperature after the second supply line is opened and, in response to determining that the temperature of the gaseous fuel is reduced to the first pre-selected fueling temperature after the second supply line is opened, communicate with valves of a third supply line of the plurality of supply lines to open the third supply line so that the fuel in the gaseous state outputtable from the fueling heat exchanger is feedable to the dispenser feed conduit via the first supply line, the second supply line and the third supply line.

In a ninth aspect, the first controller can be communicatively connected to a third temperature sensor positioned to detect a temperature of gaseous fuel being fed to the dispenser and valves of the second supply line. The first controller can also be configured to detect a temperature of the fuel in a gaseous state being fed to the dispenser via the first supply line based on temperature data received via the third temperature sensor and, in response to determining that the temperature of the gaseous fuel being fed to the dispenser via the first supply line is at or below a first pre-selected fueling temperature, communicate with the valves of the second supply line to open the second supply line so the fuel in the gaseous state outputtable from the fueling heat exchanger is feedable to the dispenser feed conduit via the first supply line and the second supply line.

In some embodiments, a temperature of the fuel in the gaseous state being fed to the dispenser can be increasable to a second pre-selected fueling temperature that is higher than the first pre-selected fueling temperature after the second supply line is opened. The first controller can also be configured to determine that the temperature of the gaseous fuel is reduced to the first pre-selected fueling temperature after the second supply line is opened and, in response to determining that the temperature of the gaseous fuel is reduced to the first pre-selected fueling temperature after the second supply line is opened, communicate with valves of a third supply line of the plurality of supply lines to open the third supply line so that the fuel in the gaseous state outputtable from the fueling heat exchanger is feedable to the dispenser feed conduit via the first supply line, the second supply line and the third supply line.

In a tenth aspect, the apparatus of the fifth aspect can include one or more features of the sixth aspect, seventh aspect, eighth aspect, and/or ninth aspect. Embodiments can also include other features, examples of which are discussed below in conjunction with exemplary embodiments discussed herein. It should therefore be appreciated that embodiments of the apparatus can include other features or elements.

In an eleventh aspect, a control system can be provided. The control system can include a first controller having a processor communicatively connected to a non-transitory computer readable medium. The first controller can be communicatively connected to a first temperature sensor positioned to determine a temperature of a compression system that is activatable to feed fuel stored in a fuel storage tank to a dispenser via a dispenser feed conduit. The first controller can also be communicatively connectable to a first vent valve of a first vent conduit positioned between the compression system and a fueling heat exchanger; a second vent valve of a second vent conduit connected to the dispenser feed conduit; a valve of a bypass conduit positioned between the compression system and the dispenser feed conduit so that fluid outputtable from the compression system is passable to the dispenser feed conduit while bypassing the fueling heat exchanger positioned between the compression system and one or more supply lines to vaporize the fuel into a gaseous state for feeding to the dispenser feed conduit via the one or more of the supply lines, and a second temperature sensor positioned to determine or detect a temperature of fluid adjacent to a second vent conduit or within the second vent conduit. The first controller can be configured to detect that a temperature of fluid adjacent the second vent valve is above a first pre-selected temperature threshold via data from the second temperature sensor while temperature data of the temperature sensor indicates the temperature of the compression system is above a pre-selected compression system operational temperature while there is a demand for fuel at the dispenser and communicate with the second vent valve to open the second vent valve and the valve of the bypass conduit to open the bypass conduit to facilitate fluid from the fuel storage tank being passed through the compression system and subsequently passed to the second vent conduit for venting. The first controller can also be configured so that in response to determining that a temperature of the fluid adjacent the second vent valve is at the first pre-selected temperature threshold, the first controller communicates with the second vent valve to close the second vent valve, communicates with the valve of the bypass conduit to close the bypass conduit, and communicates with the first vent valve to open the first vent valve to stop venting of the fluid via the second vent conduit and initiate venting of the fluid via the first vent conduit.

In a twelfth aspect, the first controller can also be configured so that in response to determining that the temperature of the fluid adjacent the second vent valve is at a second pre-selected temperature threshold that is higher than the first pre-selected temperature threshold based on temperature data received via the second temperature sensor, the first controller communicates with the first vent valve, the second vent valve, and the valve of the bypass conduit so that the first vent valve is closed, the valve of the bypass conduit is opened and the second vent valve is opened to stop venting of the fluid via the first vent conduit and initiate venting of the fluid via the second vent conduit.

In a thirteenth aspect, the control system can include a second controller having a processor communicatively connected to a non-transitory computer readable medium. The second controller can be communicatively connected to a third temperature sensor positioned to determine a temperature of fuel in a gaseous state being fed to the dispenser via the dispenser feed conduit and valves of at least a second supply line of the one or more supply lines that includes a first supply line and the second supply line. The second controller configured to detect a temperature of the fuel in the gaseous state being fed to the dispenser via the first supply line based on temperature data received from the third temperature sensor and, in response to determining that the temperature of the gaseous fuel being fed to the dispenser via the first supply line is at or below a first pre-selected fueling temperature, communicate with the valves of the second supply line to open the second supply line so the fuel in the gaseous state outputtable from the fueling heat exchanger is feedable to the dispenser feed conduit via the first supply line and the second supply line.

In a fourteenth aspect, the control system of the eleventh aspect can include one or more features of the twelfth or thirteenth aspect as well as other features. Examples of features or elements that can be included in the control system include exemplary features and elements discussed herein. Embodiments of the control system can be utilized in embodiments of the process and/or embodiments of the apparatus as well.

In a fifteenth aspect, a process for supplying fuel from a fuel storage tank to a dispenser can include feeding fuel stored in the fuel storage tank to a compression system for undergoing compression and subsequently being fed to a heat exchanger to vaporize the fuel so that the fuel is gaseous, feeding the gaseous fuel to a first supply line of a plurality of supply lines for passing the gaseous fuel to a dispenser for dispensing to a fuel tank of a vehicle via a dispenser feed conduit connected to the supply lines, in response to determining that a temperature of the gaseous fuel being fed to the dispenser is at or below a first pre-selected fueling temperature, opening a second supply line of the supply lines to feed the gaseous fuel to the dispenser feed conduit via the first supply line and the second supply line, and passing the gaseous fuel output from the first supply line and the second supply line to the dispenser via the dispenser feed conduit.

In some embodiments, the fuel can be hydrogen or can include hydrogen. In some embodiments, the first supply line can be sized to provide a greater quantity of fuel to the dispenser than the second supply line or the first supply line can be sized to provide a lesser quantity of fuel to the dispenser than the second supply line. In yet other embodiments, the first supply line can be sized to provide a similar quantity of fuel to the dispenser as compared to the second supply line.

In a sixteenth aspect, the process can be performed so that after the opening of the second supply line has occurred and in response to determining that the temperature of the gaseous fuel being fed to the dispenser is at or below the first pre-selected fueling temperature, a third supply line of the supply lines is opened to feed the gaseous fuel to the dispenser feed conduit via the first supply line, the second supply line, and the third supply line wherein a temperature of the gaseous fuel being fed to the dispenser is increased above the first pre-selected fueling temperature after the third supply line is opened. The gaseous fuel output from the first supply line, the second supply line, and the third supply line can be passed to the dispenser via the dispenser feed conduit after the third supply line was opened and the temperature of the gaseous fuel was increased above the first pre-selected fueling temperature such that the temperature of the gaseous fuel is reduced to the first pre-selected fueling temperature.

In a seventeenth aspect, the opening of the second supply line can include opening an inlet valve of the second supply line and opening an outlet valve of the second supply line.

In some embodiments, the inlet valve of the second supply line can be a modulating valve and/or the outlet valve of the second supply line can be a modulating valve.

In an eighteenth aspect, the process can be implemented so that in response to detecting a demand for fuel at the dispenser, valves are adjusted so that fluid from the fuel storage tank is passable to the compression system while the compression system is deactivated to cool the compression system to a pre-selected compression system operational temperature threshold. In some embodiments, the adjusting of the valves can include keeping a first vent valve of a first vent conduit closed and opening a second vent valve of a second vent conduit downstream of the supply lines open so that fluid from the fuel storage tank is passable from the compression system to the first supply line via a bypass conduit positioned between the first supply line and the compression system so that the fueling heat exchanger is bypassable for passing the fluid to the first supply line. In response to determining that a temperature of the fluid adjacent the second vent valve is at a first pre-selected temperature threshold, the second vent valve can be closed and the bypass conduit can be closed and the first vent valve can be opened to stop venting of the fluid via the second vent conduit and initiate venting of the fluid via the first vent conduit. In response to determining that the temperature of the fluid adjacent the second vent valve is at a second pre-selected temperature threshold that is higher than the first pre-selected temperature threshold, the first vent valve can be closed and the bypass conduit can be opened and the second vent valve can be opened to stop venting of the fluid via the first vent conduit and initiate venting of the fluid via the second vent conduit.

In some embodiments, the first vent valve and/or the second vent valve can be closed and the bypass conduit can be closed in response to determining that the compression system is at or below the pre-selected compression system operational temperature threshold. Also, the compression system can subsequently be started for feeding of the fuel within the fuel storage tank to the fueling heat exchanger to vaporize the fuel to form the gaseous fuel.

In a nineteenth aspect, a temperature of the gaseous fuel being fed to the dispenser can be increased above the first pre-selected fueling temperature after the second supply line is opened. The passing the gaseous fuel output from the first supply line and the second supply line to the dispenser via the dispenser feed conduit can occur such that the temperature of the gaseous fuel is reduced to the first pre-selected fueling temperature after the temperature of the gaseous fuel increased above the first pre-selected fueling temperature.

In a twentieth aspect, the process of the fifteenth aspect can include a number of additional features or process steps. For example, the process can include one or more features of the sixteenth aspect, seventeenth aspect, eighteenth aspect and/or nineteenth aspect. Embodiments can also include other features or process steps, examples of which are discussed herein in connection with a discussion of exemplary embodiments of the process and apparatus that can implement an embodiment of the process.

In a twenty-first aspect, an apparatus for fueling a fuel tank of a vehicle can include a fuel storage tank configured to store fuel therein. The fuel can include fuel in a liquid state. The apparatus can also include a compression system in fluid communication with the fuel storage tank for pressurization of the fuel for outputting the fuel towards a dispenser configured to fill the fuel tank of the vehicle with the fuel. A fueling heat exchanger and a plurality of supply lines including a first supply line and a second supply line can also be included. The fueling heat exchanger can be positioned between the supply lines and the compression system to vaporize the fuel output from the compression system so that the fuel in a gaseous state is feedable to one or more of the supply lines for feeding to the dispenser. A dispenser feed conduit can be positioned between the supply lines and the dispenser for feeding the fuel in the gaseous state output from the one or more of the supply lines to the dispenser. A temperature sensor can be positioned to determine a temperature of the fuel in the gaseous state being fed to the dispenser via the dispenser feed conduit and a first controller can be communicatively connected to the temperature sensor and valves of the second supply line. The first controller can have a processor communicatively connected to a non-transitory computer readable medium. The first controller can be configured to detect a temperature of the fuel in the gaseous state being fed to the dispenser via the first supply line based on temperature data received via the temperature sensor and, in response to determining that the temperature of the gaseous fuel being fed to the dispenser via the first supply line is at or below a first pre-selected fueling temperature, communicate with the valves of the second supply line to open the second supply line so the fuel in the gaseous state outputtable from the fueling heat exchanger is feedable to the dispenser feed conduit via the first supply line and the second supply line.

In some embodiments, a temperature of the fuel in the gaseous state being fed to the dispenser is increasable to a second pre-selected fueling temperature that is higher than the first pre-selected fueling temperature after the second supply line is opened. The first controller can also be configured to determine that the temperature of the gaseous fuel is reduced to the first pre-selected fueling temperature after the second supply line is opened and, in response to determining that the temperature of the gaseous fuel is reduced to the first pre-selected fueling temperature after the second supply line is opened, communicate with valves of a third supply line of the supply lines to open the third supply line so that the fuel in the gaseous state outputtable from the fueling heat exchanger is feedable to the dispenser feed conduit via the first supply line, the second supply line and the third supply line.

As noted above, the valves of the second supply line can include an inlet valve of the second supply line and an outlet valve of the second supply line. The inlet valve of the second supply line can be a modulating valve and/or the outlet valve of the second supply line being a modulating valve.

In a twenty-second aspect, the apparatus can also include a first vent conduit positioned between the compression system and the fueling heat exchanger, a second vent conduit connected to the dispenser feed conduit, and a bypass conduit positioned between the compression system and the first supply line so that fluid outputtable from the compression system is passable to the first supply line while bypassing the fueling heat exchanger. The apparatus can also include a second controller having a processor communicatively connected to a non-transitory computer readable medium. The second controller can be configured so that in response to detecting a demand for fuel at the dispenser, valves of the first vent conduit, the second vent conduit, and the bypass conduit are adjusted so that fluid from the fuel storage tank is passable to the compression system while the compression system is deactivated to cool the compression system to a pre-selected compression system operational temperature threshold.

In some embodiments, the valves of the first vent conduit, the second vent conduit, and the bypass conduit are adjusted such that a first vent valve of the first vent conduit is closed, a valve of the bypass conduit is opened, and a second vent valve of the second vent conduit is opened so that fluid from the fuel storage tank is passable from the compression system to the first supply line via the bypass conduit so that the fueling heat exchanger is bypassable for passing the fluid to the first supply line. In response to determining that a temperature of the fluid adjacent the second vent valve is at a first pre-selected temperature threshold, the second vent valve can be closed and the valve of the bypass conduit can be closed and the first vent valve can be opened to stop venting of the fluid via the second vent conduit and initiate venting of the fluid via the first vent conduit. In response to determining that the temperature of the fluid adjacent the second vent valve is at a second pre-selected temperature threshold that is higher than the first pre-selected temperature threshold, the first vent valve can be closed and the valve of the bypass conduit can be opened and the second vent valve can be opened to stop venting of the fluid via the first vent conduit and initiate venting of the fluid via the second vent conduit.

In a twenty-third aspect, the first controller can also be configured so that in response to detecting a demand for fuel at the dispenser, valves of the first vent conduit, the second vent conduit, and the bypass conduit are adjusted so that fluid from the fuel storage tank is passable to the compression system while the compression system is deactivated to cool the compression system to a pre-selected compression system operational temperature threshold.

For example, the valves of the first vent conduit, the second vent conduit, and the bypass conduit can be adjusted such that a first vent valve of the first vent conduit is closed, a valve of the bypass conduit is opened, and a second vent valve of the second vent conduit is opened so that fluid from the fuel storage tank is passable from the compression system to the first supply line via the bypass conduit so that the fueling heat exchanger is bypassable for passing the fluid to the first supply line. In response to determining that a temperature of the fluid adjacent the second vent valve is at a first pre-selected temperature threshold, the second vent valve can be closed and the valve of the bypass conduit can be closed and the first vent valve can be opened to stop venting of the fluid via the second vent conduit and initiate venting of the fluid via the first vent conduit. In response to determining that the temperature of the fluid adjacent the second vent valve is at a second pre-selected temperature threshold that is higher than the first pre-selected temperature threshold, the first vent valve can be closed and the valve of the bypass conduit can be opened and the second vent valve can be opened to stop venting of the fluid via the first vent conduit and initiate venting of the fluid via the second vent conduit.

In a twenty-fourth aspect, the apparatus of the twenty-first aspect can include one or more features of the twenty second aspect, twenty-third aspect, or other features or elements. Examples of such other features or elements can include other process control elements or other features of the exemplary embodiments discussed herein.

In a twenty-fifth aspect, a control system for an apparatus for fueling a fuel tank of a vehicle can include a first controller having a processor communicatively connected to a non-transitory computer readable medium. The first controller can be communicatively connected to a temperature sensor positioned to determine a temperature of fuel in a gaseous state being fed to a dispenser via a dispenser feed conduit and valves of at least a second supply line of a plurality of supply lines that includes a first supply line and the second supply line. The first controller can be configured to detect a temperature of the fuel in the gaseous state being fed to the dispenser via the first supply line based on temperature data received from the temperature sensor and, in response to determining that the temperature of the gaseous fuel being fed to the dispenser via the first supply line is at or below a first pre-selected fueling temperature, communicate with the valves of the second supply line to open the second supply line so the fuel in the gaseous state outputtable from the fueling heat exchanger is feedable to the dispenser feed conduit via the first supply line and the second supply line.

In some embodiments, the control system can also include a second controller having a processor communicatively connected to a non-transitory computer readable medium. The second controller can be communicatively connected to valves of a first vent conduit, a second vent conduit, and a bypass conduit in which the first vent conduit can be fluidly connected to a compression system to vent fluid output from the compression system while the compression system is deactivated, the second vent conduit can be connected to the dispenser feed conduit downstream of the supply lines and the first vent conduit, and the bypass conduit can be positioned between first vent conduit and the supply lines to that fluid passed through the bypass conduit avoids being passed through a fueling heat exchanger positioned between a compression system and the supply lines. The second controller can be configured so that in response to detecting a demand for fuel at the dispenser, the valves of the first vent conduit, the second vent conduit, and the bypass conduit are adjusted so that fluid from the fuel storage tank is passable to the compression system while the compression system is deactivated to cool the compression system to a pre-selected compression system operational temperature threshold.

It should be appreciated that other embodiments of the control system can include other process control elements or other configurations. In some embodiments, the control system may only include the first controller for example. In other embodiments, the control system can include one or more additional controllers.

Other details, objectives, and advantages of an apparatus for fuel dispensing, process for fuel dispensing, and control system for fuel dispensing, and methods of making and using the same will become apparent as the following description of certain exemplary embodiments thereof proceeds.

BRIEF DESCRIPTION OF THE DRAWINGS

Exemplary embodiments of our apparatus for fuel dispensing, process for fuel dispensing, and control system for fuel dispensing, and methods of making and using the same are shown in the drawings included herewith. It should be understood that like reference characters used in the drawings may identify like components.

DETAILED DESCRIPTION

Figure 1:
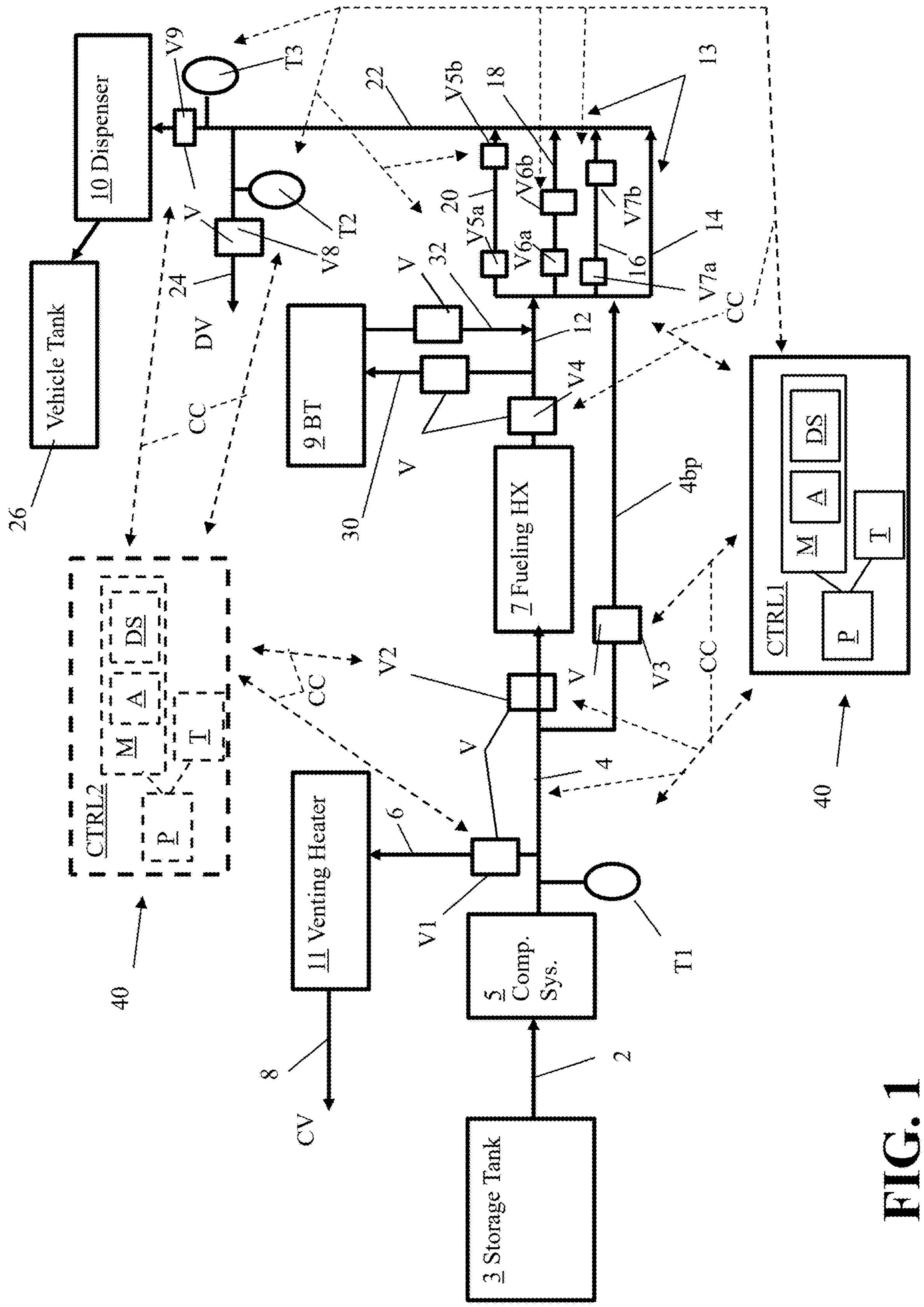
FIG. 1 is a block diagram of a first exemplary embodiment of an apparatus for fuel dispensing. Exemplary embodiments of a process for fuel dispensing can also be appreciated from FIG. 1. Also, an exemplary embodiment of a control system for fuel dispensing cam also be appreciated from the exemplary embodiment of the apparatus 1 for fuel dispensing illustrated in FIG. 1.
Figure 2:
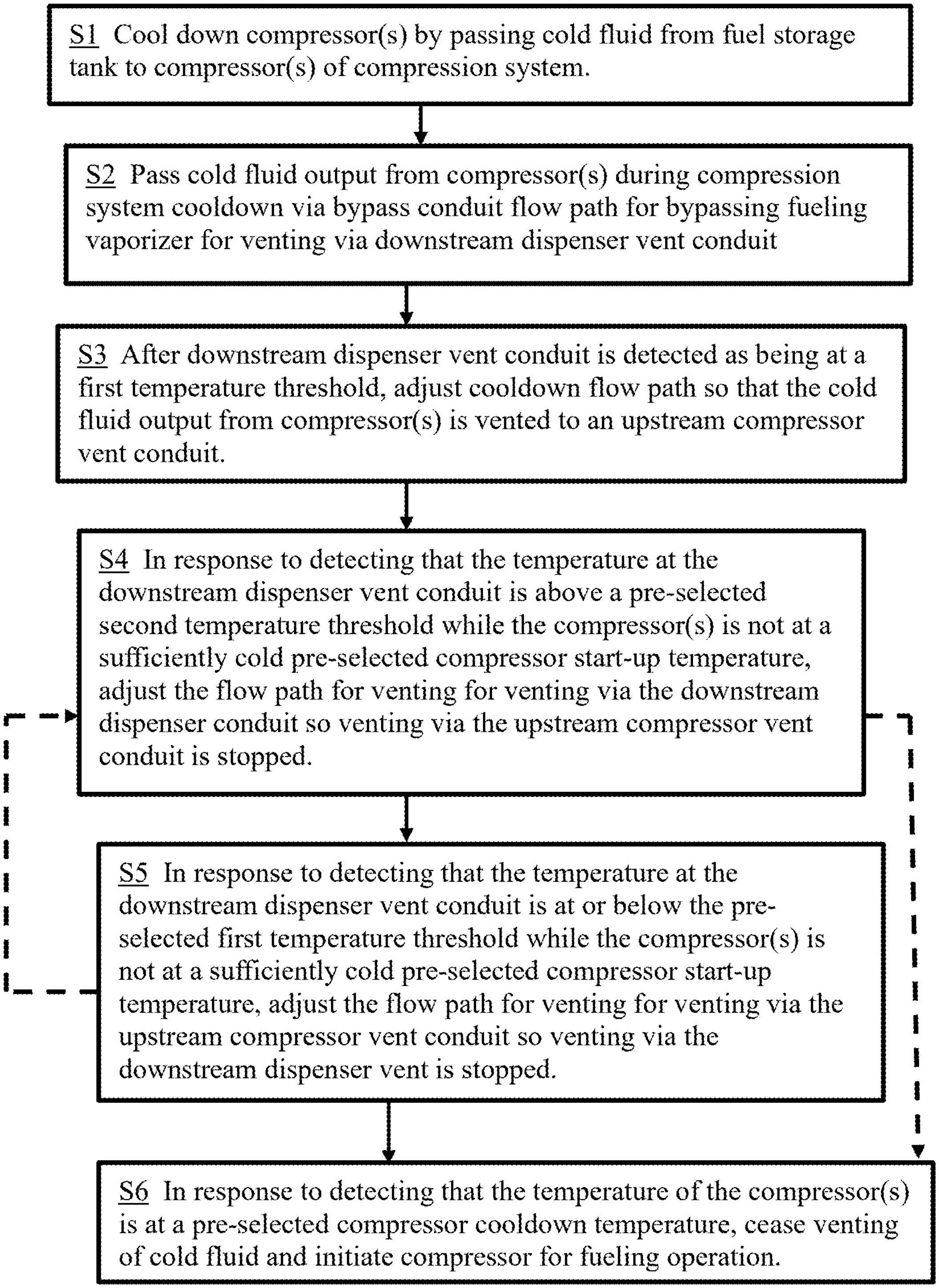
FIG. 2 is an exemplary embodiment of a process for fuel dispensing that can include a compressor system cool down process. The first exemplary embodiment of the apparatus for fuel dispensing can perform an embodiment of this process.
Figure 3:
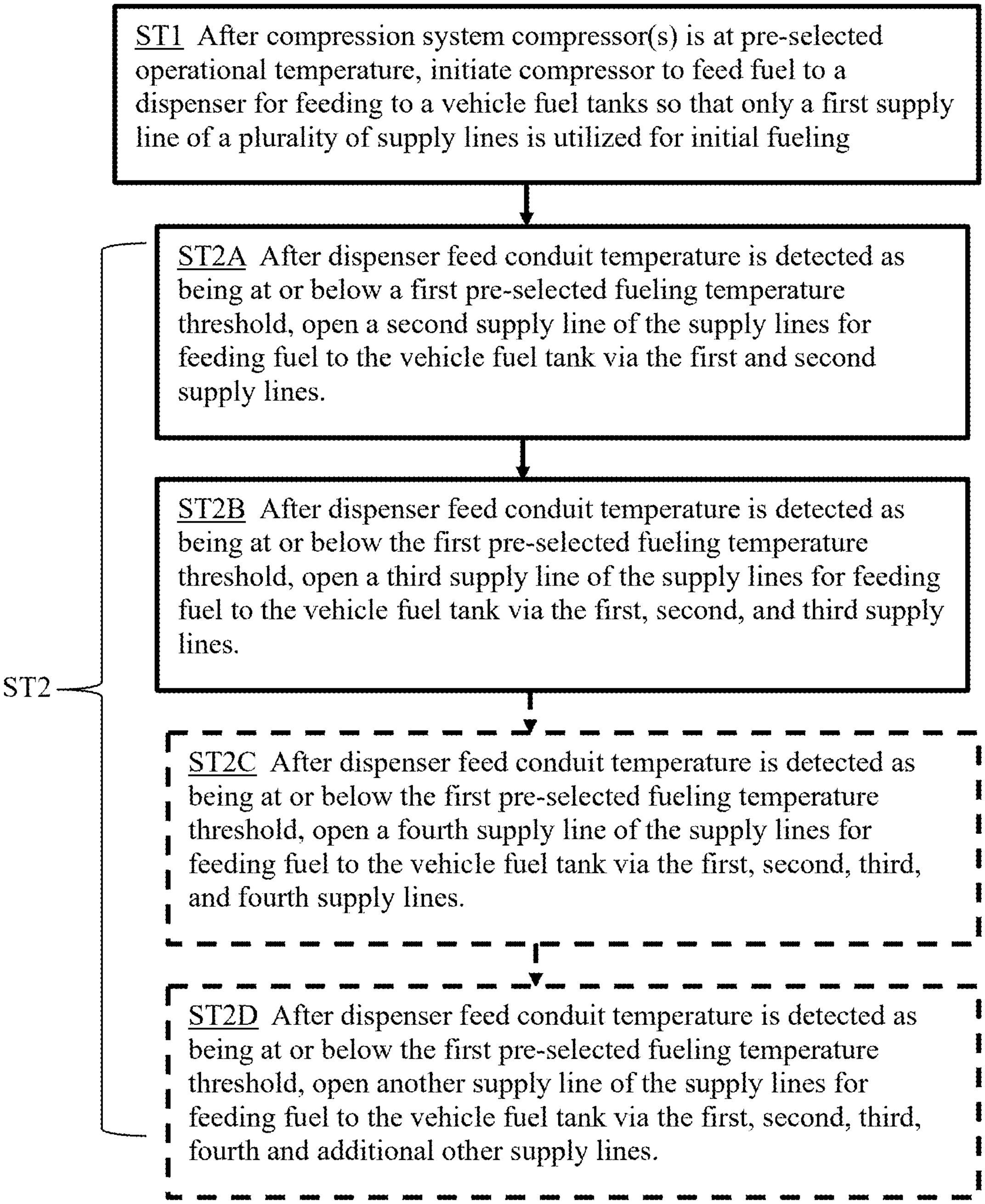
FIG. 3 is an exemplary embodiment of a process for fuel dispensing that can include a sequential supply line utilization scheme for feeding fuel to a dispenser. The first exemplary embodiment of the apparatus for fuel dispensing can perform an embodiment of this process.

Referring to FIGS. 1-3, an apparatus 1 for fuel dispensing can include a fuel storage tank 3. The storage tank 3 can be a single large tank or include a plurality of storage vessels that are sized and configured to store fuel for being provided to a dispenser 10. The fuel that is stored can be stored in a liquid form. The storage tank 3 can also have vapor of the fuel that may be formed as the liquid is stored in the storage tank 3. For example, the fuel can be hydrogen that is stored at a relatively cold temperature for being maintained as a liquid in the storage tank 3. Vapor can form as the liquid is stored in the storage tank 3 and also be present within the storage tank 3.

The fuel storage tank 3 can be connected to at least one compressor of a compression system 5. The compression system can include one or more compressors or pumps for driving fluid out of the storage tank 3 towards the dispenser 10. A compression system feed conduit 2 can be connected between the compression system 5 and the storage tank 3 for feeding the fuel to the compression system 5 for undergoing an increase in pressure for being fed downstream toward the dispenser 10.

A first temperature sensor T1 can be positioned to measure or monitor the temperature of the compression system 5 and/or the fuel that is output from the compression system 5. For example, the first temperature sensor T1 can be connected to the compression system 5 or a compression system output conduit 4 for detecting a temperature of the fluid passed through the compression system output conduit 4 via the compression system 5. The compression system output conduit 4 can be connected to a first vent conduit 6 that is positioned between the compression system 5 and a fueling heat exchanger 7 (Fueling HX). The first vent conduit 6 can include at least one valve V.

For instance, the first vent conduit 6 can have a first valve V1 that can be adjustable between an open position and a closed position. In the closed position, fluid may not pass through the first valve V1. In the open position, the first valve V1 can be open and fluid can pass through the first valve V1 to pass to a venting heater 11 (Venting Heater) for being vented as a warmed compressor vent stream CV via a venting heater output conduit 8. The first valve V1 of the first vent conduit 6 can also be considered a first venting valve V.

The first vent conduit 6 can be connected between the compression system 5 and the venting heater 11 so that fluid can be output from the compression system and fed to the venting heater 11 to be warmed therein prior to being vented to avoid venting fluid that is below a pre-selected venting temperature for the fluid. In some embodiments, the venting heater 11 can be an ambient air heat exchanger that uses ambient air as a heating medium, a heat exchanger that utilizes water as a heating medium, or other type of heat exchanger arrangement for heating the fluid output from the compression system 5 before that warmed fluid is vented. In other embodiments, the venting heater 11 can be an electric heater or other type of heater may be utilized for heating of the fluid output from the compression system 5 before that warmed fluid is vented.

In some embodiments, the first temperature sensor T1 can be positioned to measure or monitor the temperature of fluid output from the compression system 5 before that fluid is passed through the first vent conduit 6 and/or before the fluid can be passed into the fueling heat exchanger 7. This detected temperature can be utilized for indicating a temperature of the compressions system 5 (e.g. a temperature of one or more compressors or pumps of the compression system 5).

The compression system output conduit 4 can be connected between the compression system 5 and the fueling heat exchanger 7 for feeding fuel output from the compression system 5 to the fueling heat exchanger 7 to be warmed via a heating medium of the fueling heat exchanger 7. The fueling heat exchanger 7 can utilize water, ambient air, or another type of heating medium for heating the fuel fed to the fueling heat exchanger 7. The fueling heat exchanger 7 can be configured to vaporize the fuel fed therein so that the warmed fuel output from the fueling heat exchanger 7 is a gaseous fuel (e.g. hydrogen gas that is entirely gaseous, etc.). The fueling heat exchanger 7 can have a fueling heat exchanger output conduit 12 to which it is connected for outputting the warmed fuel.

The warmed fuel output from the fueling heat exchanger 7 can be fed to one or more supply lines 13 that can be positioned between the fueling heat exchanger 7 and the dispenser 10 for feeding the fuel to the dispenser 10. The fueling heat exchanger 7 can also be fluidly connected to at least one buffer tank 9 (BT). The at least one buffer tank 9 can be positioned to store the fuel in gaseous form and subsequently output the stored fuel for being fed to the dispenser 10 via one or more of the supply lines 13. At least one buffer tank 9 can be positioned between the supply lines 13 and the fueling heat exchanger 7 to receive fuel form the fueling heat exchanger 7 for storage and for outputting the stored fuel to the dispenser via the supply lines 13.

A bypass conduit **4*bp* can be positioned between the compression system 5 and the supply lines 13. For example, the bypass conduit 4*bp* can be connected to the compression system output conduit 4 at a location that is upstream of the fueling heat exchanger 7 and also be connected to the supply lines 13 so that fuel output from the compression system 5 can be passed to the supply lines without having to pass through the fueling heat exchanger 7. As another example, the bypass conduit 4*bp* can be fluidly connected between the compression system 5 and the supply lines 13 so that the fueling heat exchanger 7 can be bypassed by fluid output from the compression system 5. This bypassing of the fueling heat exchanger 7 can also result in bypassing some or all of the compression system output conduit 4 and some or all of the fueling heat exchanger output conduit 12. The bypass conduit 4*bp* can also be positioned and configured to facilitate the fuel output from the compression system 5 to be routed to the supply lines 13 while also bypassing the buffer tank(s) 9 that can be positioned between the supply lines 13 and the fueling heat exchanger 7 in addition to bypassing the fueling heat exchanger 7**.

The compression system output conduit 4 can have a valve V that is positioned between the compression system 5 and the fueling heat exchanger 7 that is downstream of a location at which the bypass conduit **4*bp* is connected to the compression system 5 and/or compression system output conduit 4. The bypass conduit 4*bp* can also include a valve V that is positioned between the compression system 5 and the supply lines 13**.

The valve V that is positioned between the compression system 5 and the fueling heat exchanger 7 that is downstream of a location at which the bypass conduit **4*bp* is connected to the compression system 5 and/or compression system output conduit 4 can be a second valve V2 that can be adjustable between a closed position and an open position. In the closed position, fluid may not pass through the second valve V2 to stop fuel that may be output from the compression system 5 from being feedable to the fueling heat exchanger 7. In the open position, the second valve V2 can be open and fluid can pass through the second valve V2 to pass to the fueling heat exchanger 7 for being vaporized. When the second valve is opened, the first valve V1 and the valve V of the bypass conduit can be closed so that all the fuel output from the compression system 5 is fed to the fueling heat exchanger 7**.

The valve V of the bypass conduit **4*bp* that is positioned between the compression system 5 and the supply lines 13 can be a third valve V3 that can be adjustable between a closed position and an open position. In the closed position, fluid may not pass through the third valve V3 to stop fuel that may be output from the compression system 5 from being passed through the bypass conduit 4*bp*. When the third valve V3 is closed, the second valve V2 or the first valve V1 can be open. When the third valve V3 is open, the second valve V2 and the first valve V1 can be closed. In the open position, the third valve V3 can be open and fluid can pass through the third valve V3 to be passed to the supply lines 13 while avoiding the fueling heat exchanger 7 and, in some embodiments also avoiding the buffer tank(s) 9**.

As noted above, the first valve V1 can be a venting valve. When this first valve V1 is open, the second valve V2 and the third valve V3 may be closed so that the fuel output from the compression system 5 can be vented instead of being passed to the fueling heat exchanger 5 and/or the bypass conduit **4*bp***.

A fourth valve V4 can be positioned downstream of the fueling heat exchanger 7 so the valve is between the fueling heat exchanger 7 and the supply lines 13. This valve V can also be positioned upstream of a location at which fuel is feedable to at least one buffer tank 9 via a buffer tank feed conduit 30 and/or a location at which fuel can be output from the buffer tank(s) 9 via a buffer tank output conduit 32. The fourth valve V4 can be a valve V of the fueling heat exchanger output conduit 12, for example. In the closed position, fluid may not pass through the fourth valve V4. In the open position, the fourth valve V4 can be open and fluid can pass through the fourth valve V4 to be passed to the supply lines 13 and/or the buffer tank(s) 9. When the fourth valve V4 is open, the third valve V3 can be closed. When the third valve V3 is open, the fourth valve V4 can be closed.

The buffer tank feed conduit 30 can include at least one valve V and the buffer tank output conduit 32 can include at least one valve V. Each valve can be adjustable between open and closed positions. In a closed position, the valve V of the buffer tank feed conduit 30 can prevent fuel from being fed to the buffer tank(s) 9 and in the open position the valve V of the buffer tank feed conduit 30 can permit fuel to be passed through the valve to the buffer tank(s) 9 for storage therein. In a closed position, the valve V of the buffer tank output conduit 32 can prevent fuel stored in the buffer tank(s) 9 from being output from the buffer tank(s) 9 toward the dispenser 10 and in the open position the valve V of the buffer tank output conduit 32 can permit fuel stored in the buffer tank(s) 9 to pass out of the buffer tank(s) for being fed to the dispenser 10 via one or more of the supply lines 13.

The supply lines 13 can include a first supply line 14, a second supply line 16, a third supply line 18, and a fourth supply line 20. In some embodiments, each supply line can be a single supply line conduit. In other embodiments, each supply line can include a set of supply conduits (e.g. each supply line can include multiple supply conduits such that the first, second, third, and fourth supply lines 14, 16, 18, and 20 can represent eight, twelve, sixteen, or twenty overall supply lines, etc.). Each supply line 13 can include an inlet valve V positioned adjacent an inlet of the supply line at which fuel output from the bypass conduit **4*bp*, fueling heat exchanger 7, or buffer tank(s) 9 can be passed for passing through the supply line. Each supply line 13 can also include an outlet valve V positioned adjacent an outlet of the supply line through which fuel can pass for being fed to a dispenser feed conduit 22 that can be connected between the dispenser 10 and the supply lines 13. In some embodiments, a first supply line 14 of the multiple supply lines 13** may not include an inlet valve V and also may not include an outlet valve V.

For example, the first supply line 14 may not include any valves V in some embodiments. The second supply line 16 can include an inlet valve V**7*a* at an inlet of the second supply line 16 and an outlet valve V7*b* at an outlet of the second supply line 16. Each of these valves can be adjustable between open and closed positions. In the closed positions, fluid may not pass through the inlet valve V7*a* and the outlet valve V7*b* of the second supply line 16. In the open positions, these valves V can be open and fluid can pass through the inlet valve V7*a* and the outlet valve V7*b* of the second supply line 16 to be passed through the supply line to the dispenser feed conduit 22**.

The third supply line 18 can include an inlet valve V**6*a* at an inlet of the third supply line 18 and an outlet valve V6*b* at an outlet of the third supply line 18. Each of these valves can be adjustable between open and closed positions. In the closed positions, fluid may not pass through the inlet valve V6*a* and the outlet valve V6*b* of the third supply line 18. In the open positions, these valves V can be open and fluid can pass through the inlet valve V6*a* and the outlet valve V6*b* of the third supply line 18 to be passed through the supply line to the dispenser feed conduit 22**.

The fourth supply line 20 can include an inlet valve V**5*a* at an inlet of the fourth supply line 20 and an outlet valve V5*b* at an outlet of the fourth supply line 20. Each of these valves can be adjustable between open and closed positions. In the closed positions, fluid may not pass through the inlet valve V5*a* and the outlet valve V5*b* of the fourth supply line 20. In the open positions, these valves V can be open and fluid can pass through the inlet valve V5*a* and the outlet valve V5*b* of the fourth supply line 20 to be passed through the supply line to the dispenser feed conduit 22**.

The dispenser feed conduit 22 can be connected between the supply lines 13 and the dispenser 10 to feed fluid received from one or more of the supply lines 13 to the dispenser 10. The dispenser 10 can be fluidly connectable to a vehicle fuel tank (e.g. via a nozzle of the dispenser, etc.) to feed fuel received via the dispenser feed conduit 22 to the fuel tank 26 of a vehicle (e.g. a vehicle tank).

The dispenser feed conduit 22 can also be connected to a second vent conduit 24, which can be positioned downstream of the first vent conduit 6 for venting of fluid that is closer to the dispenser 10. The second vent conduit 24 can include a second vent valve V8 that can be adjustable between an open position and a closed position. In the open position, fluid can pass through this valve V for being vented via the second vent conduit 24 as a second vent stream DV. In the closed position, the second vent valve V8 can prevent fluid from passing through the second vent conduit 24 so no fluid is ventable via the second vent conduit 24.

The dispenser feed conduit 22 can also include a dispenser feed valve V9 that can be positioned adjacent the dispenser 10. This valve V can also be adjustable between an open position and a closed position. In the open position, fluid can pass through the dispenser feed valve V9 of the dispenser feed conduit 22 for being fed to the dispenser 10. In the closed position, the valve V can prevent fluid from passing to the dispenser 10. The valve V of the dispenser feed conduit 22 can be closed when the valve V of the second vent conduit 24 is open. The valve of the second vent conduit 24 can be closed when the valve V of the dispenser feed conduit 22 is open.

A second temperature sensor T2 can be positioned adjacent the valve V of the second vent conduit 24 to measure or monitor the temperature of fluid that is to be vented via the second vent conduit 24. In some embodiments, the second temperature sensor T2 can be positioned upstream of the valve V of the second vent conduit 24. In other embodiments, the second temperature sensor T2 can be positioned downstream of the valve V of the second vent conduit 24 or at the valve V.

A third temperature sensor T3 can be positioned adjacent to the dispenser feed valve V of the dispenser feed conduit 22 and/or the dispenser 10. The third temperature sensor T3 can be positioned upstream of the dispenser feed valve V9, at this valve, or downstream of this valve, for example. The third temperature sensor T3 can be positioned and configured to measure or monitor the temperature of fluid that is to be fed to the dispenser 10 via the dispenser feed valve V9.

The apparatus 1 can also include at least one controller 40 that can be included in the control system of the apparatus 1. Each controller 40 can be a computer device that includes a process P that can be communicatively connected to non-transitory memory M and at least one transceiver T. The memory M can have at least one application A and/or at least one data store DS stored thereon. The memory M can store code that defines at least one automated process control process that can be performed via the controller 40 when the processor P of the controller 40 runs that code. Each controller 40 can be communicatively connected at least some of the valves V of the apparatus via communicative connections CC between the valves V and the controller 40. Each controller 40 can also be communicatively connected to each of the temperature sensors or at least some of the temperature sensors via communicative connections CC between the controller 40 and the sensor(s) as well (e.g. first temperature sensor T1, second temperature sensor T2, and/or third temperature sensor T3, can be communicatively connected at least one controller 40, etc.). The controller(s) 40 can also be communicatively connected to other process control elements (e.g. pressure sensor(s), flow sensor(s), detectors, etc.) or equipment of the apparatus 1 (e.g. compression system 5, dispenser 10, fueling heat exchanger 7 and/or venting heater 11, etc.).

The controller(s) 40 can also be communicatively connectable to at least one input device, at least one output device, and/or an operator computer device as well. For example, each controller 40 can be communicatively connected to a display, a printer, a pointer device, a keyboard, at least one touch screen, an operator workstation, an operator smart phone, an operator laptop computer, an operator desktop computer, or other type of operator device. An operator can utilize an input device, an output device, and/or an operator device to adjust pre-defined setpoints the controller 40 may utilize and/or to provide instructions to the controller 40 for controlling the positioning of different valves V and/or the operation of different equipment.

The controller arrangement utilized in the apparatus 1 can include only a first controller CTRL 1 or can include multiple controllers, such as a first controller CTRL1 and a second controller CTRL2 (shown in broken line in FIG. 1).

The apparatus 1 can be configured so that a cool down of the compression system 5 can occur in response to a use of a vehicle desiring to fill the vehicle fuel tank 26 with fuel via the dispenser 10. Such a cool down operation can be actuated in response to determining that the temperature indicated by data of the first temperature sensor T1 shows that the temperature of the compression system 5 and/or fluid to be output from the compression system 5 is above a pre-selected compression start-up temperature. The pre-selected compression system start-up temperature can be a temperature that is at −100° C., or under −100° C. (e.g. at or under −105° C., at or under −110° C., etc.).

Also (or alternatively), the cool down operation can be actuated in response to determining a demand at the dispenser via another approach (e.g. a prediction or other pre-selected determination criteria). For example, the cool down operation can be actuated in response to detecting activation of the dispenser (e.g. activation of the dispenser from a sleep state or low power state, activation of the dispenser that may occur after payment information is provided at the dispenser, etc.). As another example, the cool down operation can be actuated in response to a pre-selected time of day occurring, wherein the pre-selected time of day can be pre-defined or otherwise determined based on a predicted time in which the dispenser is expected to experience use for fueling multiple vehicles. As yet another example, one or more proximity sensors can be positioned to detect the presence of a vehicle near a dispenser for fueling and such a determination can be utilized to determine that a demand at the dispenser is present or will occur for actuation of the cool down operation.

The apparatus 1 can be configured to implement an embodiment of this process for performing a cooling down of the compression system as well as other conduits along which fuel may be passed as the fuel is fed to the dispenser for filling a vehicle fuel tank before the compression system is operated to initiate fueling of a vehicle fuel tank.

For example, in response to determining that there is a demand for fuel at the dispenser 10 and that a detected temperature of the compression system 5 is above a pre-selected operational temperature (e.g. a temperature of −100° C. or a temperature that is below −100° C. provided via the first temperature sensor T1), the compression system 5 can be remained off and valves can be adjusted so that various valves V are closed so that cold fluid can be output from the storage tank 3 for feeding to at least one compressor of the compression system 5 and subsequently being passed out of the compression system 5 to be fed to the second vent conduit 24 via the bypass conduit 4*pb*, the first supply line 14, the dispenser feed conduit 22 and the second vent conduit 24. After the temperature of fluid being vented via the second vent conduit 24 is determined to be at or below a pre-selected dispenser feed temperature, the valves V can be adjusted so that the cold fluid output from the storage tank 3 for cooling down the compression system 5 is no longer routed for venting via the second venting conduit 24, but is instead vented via the first vent conduit 6 (e.g. via the first vent conduit valve V1 being opened and the second and third valves V2 and V3 of the compression system output conduit 4 and the bypass conduit 4*bp* being closed). This venting via the first vent conduit 6 can occur until the temperature monitored by the second temperature sensor T2 at the second vent conduit 24 or adjacent that conduit is determined to be at or above a pre-selected cool down trigger temperature.

In response to detecting that the temperature at the downstream second vent conduit 24 is above a pre-selected second temperature threshold while the compressor(s) of the compression system 5 is not at a sufficiently cold temperature (e.g. at a pre-selected compressor system start-up temperature as can be detected via the first temperature sensor T1), the flow path for venting via the downstream dispenser feed conduit 22 and second vent conduit 24 can again be actuated via adjustment of different valves V so venting via the upstream first vent conduit 6 is stopped and venting via the downstream second vent conduit 24 is resumed via this conduit while also using the cold fluid to cool down the first supply line 14 (or all the supply lines 13) and the dispenser feed conduit 22. For instance, the first and second valves V1 and V2 can be closed, and the third valve V3 of the bypass conduit 4*bp* and the second vent conduit valve V8 can be opened. The fueling heat exchanger feed and output valves (e.g. second valve V2 and fourth valve V4) can be closed and the inlet and outlet valves of other supply lines 13 that are not the first supply line 14 can also be closed to shorten the flow path of the cold fluid being vented to help limit the amount of fuel used for the cool down operation.

The switching between use of the first vent conduit 6 and second vent conduit 24 for venting can be performed repeatedly during the cooling down of the compression system until the compression system is determined to be at a pre-selected operational start-up temperature based on the temperature data of the first temperature sense T1. The switching of venting via the downstream second vent conduit 24 and upstream first vent conduit 6 can be based on the temperature detected by the second temperature sensor T2 (e.g. venting via the second vent conduit 24 can be stopped when the temperature is at a first pre-selected temperature, or a dispenser feed temperature, and the venting via the second vent conduit 24 can be resumed in response to the temperature detected by the second temperature sensor T2 being at or above a second pre-selected temperature above the first pre-selected temperature). Once the pre-selected operational start-up temperature is determined to have been reached based on the temperature data of the first temperature sense T1, the compression system 5 can be started up for feeding fuel from the storage tank 3 to the dispenser 10 via the fueling heat exchanger 7, one or more supply lines 13, and the dispenser feed conduit 22. The venting valves and other valves V can also be adjusted so that the fuel output from the operational compression system is passed through the fueling heat exchanger 7 and fed to the dispenser feed conduit 22 via one or more supply lines 13 for being fed to the dispenser 10.

FIG. 2 illustrates an example of this type of cool down processing that can occur before the compression system 5 is turned on for fueling operations. As may be appreciated from FIG. 2, in a first step S1, at least one compressor of the compression system 5 can be cooled down while the compressor(s) are off by passing cold fluid from the fuel storage tank 3 to the compressions system 5. A first controller CTRL1 can actuate the initiation of this first step in some embodiments based on a detection of a demand for fuel at the dispenser 10 and the temperature data of the first temperature sensor T1 indicating that the temperature of the compression system is above a pre-selected compression system operational temperature threshold. The cooling down initiation can occur by the closing of the first vent conduit valve (e.g. first valve V1), the feed valve for the fueling heat exchanger (e.g. the second valve V2), the fueling heat exchanger output conduit output valve V (e.g. fourth valve V4) and the dispenser feed conduit valve V9. To help limit the amount of fuel needed to perform the cooling down of the supply lines and dispenser feed conduit 22, the inlet and outlet valves of the all the supply lines 13 other than the first supply line 14 can also be closed (e.g. the inlet and outlet valves V5*a*, V5*b*, V6*a*, V6*b*, V7*a*, and V7*b* of the second, third and fourth supply lines 16, 18, and 20 can be closed). The first controller CTRL1 can communicate with these valves to actuate their adjustment based on the temperature data received from the first and second temperature sensors T1 and T2.

In a second step S2, cold fluid can be output from the compressor(s) of the compression system 5 while the compression system 5 is off and passed through the bypass conduit 4*bp* for bypassing the fueling heat exchanger 7 as well as some of the supply lines 13 for venting via the second vent conduit 24, which can be upstream of the first vent conduit 6, which can also be considered an upstream compressor vent conduit. The opened vent valve can provide a pressure differential to facilitate the flow of fluid from the fuel storage tank 3 to a vent conduit for venting while the compression system 5 is deactivated.

In a third step S3, the second vent conduit 24 can be detected as being at or below a first pre-selected temperature threshold. This first temperature threshold can be a pre-selected temperature such as −30° C., −17° C., a temperature between −30° C. and −40° C., a temperature between −17° C. and −40° C., or other suitable temperature. The first controller CTRL1 can make such a determination based on temperature data received from the second temperature sensor T2, for example. In response to such a detected temperature, the first controller CTRL1 can communicate with different valves V to adjust the venting flow path so that the second vent conduit 24 is no longer utilized for venting and, instead, the first vent conduit 6 is utilized for venting. For instance, the first controller CTRL1 can communicate with valves V to close the bypass conduit valve (e.g. third valve V3) and open the valve V of the first vent conduit 6 (e.g. first valve V1). The cold fluid output from the compression system 5 while that compression system 5 is still off can then be vented via the first vent conduit 6 instead of the second vent conduit 24. In venting via the first vent conduit 6, the cold fluid can pass through the venting heater 11 for being output for venting at a warmer temperature (e.g. a pre-selected venting temperature).

In a fourth step S4, the temperature at the downstream second vent conduit 24 can be detected as being above a second pre-selected temperature threshold while the temperature of the compression system is still above the pre-selected compression system operational temperature (e.g. a temperature at or below −100° C., etc.). Such a second pre-selected temperature threshold can be between 1° C. and 10° C. or other suitable temperature (e.g. between 3° C. and 15° C.) in some embodiments.

For instance, the first controller CTRL1 can make a determination based on temperature data received from the second temperature sensor T2 and the first temperature sensor T1, for example. In response to such a detected pre-selected second temperature while the compression system 5 is still detected as being too warm for operational start-up, the first controller CTRL1 can communicate with different valves V to adjust the venting flow path so that the first vent conduit 6 is no longer utilized for venting and, instead, the second vent conduit 24 is utilized for venting. For instance, the first controller CTRL1 can communicate with valves V to open the bypass conduit valve (e.g. third valve V3), open the valve V of the second vent conduit (e.g. second vent valve V8) and close the valve V of the first vent conduit 6 (e.g. first valve V1). The cold fluid output from the compression system 5 while that compression system 5 is still off can then be vented via the second vent conduit 24 instead of the first vent conduit 6.

Thereafter, the temperature of the second vent conduit 24 can again be detected as being at or below the first pre-selected temperature threshold in a fifth step S5. This detection can occur while the compression system 5 is still detected as being at a temperature above the pre-selected compression system operational temperature (e.g. a temperature at or below −100° C., etc.). For instance, the first controller CTRL1 can make a determination based on temperature data received from the second temperature sensor T2 and the first temperature sensor T1. In response to such a detected pre-selected first temperature being reached at the second vent conduit 24 while the compression system 5 is still detected as being too warm for operational start-up, the first controller CTRL1 can communicate with different valves V to adjust the venting flow path so that the second vent conduit 24 is no longer utilized for venting and, instead, the first vent conduit 6 is utilized for venting. For instance, the first controller CTRL1 can communicate with valves V to close the bypass conduit valve (e.g. third valve V3), open the valve V of the first vent conduit (e.g. first valve V1) and close the valve V of the second vent conduit 24 (e.g. second vent valve V8). The cold fluid output from the compression system 5 while that compression system 5 is still off can then be vented via the first vent conduit 6 instead of the first vent conduit 6.

As indicated by broken lines in FIG. 2, this switching between use of the first upstream vent conduit 6 for venting and the downstream second vent conduit 24 can occur multiple different additional times. Once the compression system 5 is determined to be at or below the pre-selected compression system operational temperature, the venting can be stopped and the valves V can be adjusted so that the fuel can be output from the storage tank via operation of the compression system 5 for feeding the fuel to the fueling heat exchanger 7 and subsequently to the dispenser via one or more supply lines 13 and the dispenser feed conduit 22 in a sixth step S6. For example, the first controller CTRL1 can receive temperature data from the first temperature sensor T1 that indicates that the compression system 5 is at or below the pre-selected compression system operational temperature. In response to such a detection, the first controller CTRL1 can communicate with the valves V of the first vent conduit 6 and the second vent conduit 24 to close those valves, communicate with one or more compressors of the compression system 5 to turn on the compressor(s), and communicate with the third valve V3 to close that valve and communicate with the second and fourth valves V2 and V4 to open those valves so that fuel output from the compression system 5 can be passed to the fueling heat exchanger 7 for vaporization and subsequent feeding to at least one supply line 13 for feeding to the dispenser feed conduit 22.

In some embodiments, the first controller CTRL1 may communicate with inlet and outlet valves V5*a*, V5*b*, V6*a*, V6*b*, V7*a*, and V7*b* of different supply lines 13 to open those valves at the initiation of feeding of the fuel via the compression system 5 being activated. In other embodiments, the first controller CTRL1 may communicate with those valves at different times to open those valves sequentially in accordance with a pre-selected supply line utilization scheme to facilitate a faster fueling process. For example, the first supply line 14 can be utilized as the only supply line for feeding fuel to the dispenser 10 for a first phase of fueling. This can result in the fuel being fed to the dispenser more quickly via a single supply line 14, or set of supply lines, but can also incur a larger pressure drop. This larger pressure drop can be accommodated at the initiation of fueling, however, because an emptier vehicle fuel tank has a lower pressure (e.g. because there is less fuel in the fuel tank). This larger pressure drop can therefore be accommodated without significant detriment to the fueling process or speed of the fueling.

In response to detection of the dispensing feed temperature being at or below a first pre-selected fueling temperature, an additional supply line (or set of supply lines) can be opened for feeding fuel to the dispenser. A first pre-selected fueling temperature can be detected via temperature data provided by the third temperature sensor T3 that is at or adjacent the dispenser feed valve V9, for example and the first controller CTRL1 or a second controller CTRL2 that may be communicatively connected to the third temperature sensor T3 and valves V of the supply lines 13 can be utilized to make the determination that the dispensing feed temperature is at or below a first pre-selected fueling temperature based on the temperature data of the third temperature sensor T3. This adding of an additional supply line 13 (or set of supply lines 13) can reduce the overall pressure drop, which can also help accommodate the flow of fuel into the fuel tank via the dispenser 10 since the fuel tank is now fuller and at a higher pressure due to the filling that previously occurred using only a single supply line or set of supply lines. The added supply line 13 may have warmer fuel therein prior to the opening of the inlet and outlet valves of the added supply line since that stored fuel in the supply line 13 may warm as it is within the supply line 13 between closed inlet and outlet valves and this may increase the temperature of the fuel being fed to the dispenser 10 that can be detected via the third temperature sensor T3. This warming may result in the fuel being fed to the dispenser 10 being above the first pre-selected fueling temperature as the warm fuel is fed to the dispenser via the newly opened additional supply line with the colder fuel from the previously utilized first supply line 13. After this warmer fuel is fed to the dispenser, cooler fuel output from the compression system 5 (after being vaporized via the fueling heat exchanger 7) will be fed to the dispenser 10 via the multiple in-use opened supply lines 13, which can result in the temperature of the fuel fed to the dispenser decreasing back to the first pre-selected fueling temperature (or below that temperature).

In some embodiments, the triggering of the use of the second supply line 16 for adding use of another supply line for feeding fuel to the dispenser 10 can also be based on a detected pressure of the fuel being fed to the fuel tank via a pressure sensor that is positioned to detect or monitor a pressure of the vehicle fuel tank. For example, the pressure that is detected can indicate that the pressure drop for feeding the fuel to the dispenser may need to be reduced via the additional use of a supply line 13 to help trigger actuation of the supply line adjustment in addition to the temperature detected by the third temperature sensor T3.

In response to the subsequent detection of the dispensing feed temperature being at or below the first pre-selected fueling temperature, yet another additional supply line 13 (or set of supply lines) can be opened for feeding fuel to the dispenser. This adding of another additional supply line 13 (or set of supply lines 13) can further reduce the overall pressure drop incurred from providing fuel to the dispenser 10, which can also help further accommodate the flow of fuel into the fuel tank via the dispenser 10 since the fuel tank is now fuller and at a higher pressure due to the filling that previously occurred using only the first and second supply lines that were previously utilized in fueling. The added supply line may again have warmer fuel therein prior to the opening of the inlet and outlet valves of the added supply line since that stored fuel in the supply line 13 may warm as it is within the supply line 13 between closed inlet and outlet valves and this may increase the temperature of the fuel being fed to the dispenser that can be detected via the third temperature sensor T3. As the warmer fuel is fed to the dispenser 10 via the newly opened additional supply line with the colder fuel of the first and second supply lines that were previously used and are still being used for conveying fuel to the dispenser 10, the detected temperature of the fuel being fed to the dispenser may increase above the first pre-selected fueling temperature. As the newly opened supply line 13 receives colder fluid output from the compression system 5 (after being vaporized via the fueling heat exchanger 7), the fluid being fed to the dispenser 10 will continue to decrease in temperature until the fuel fed via the opened supply lines again falls to the first pre-selected fueling temperature (or a lower temperature).

In some embodiments, the triggering of the use of the third supply line 18 for adding use of another supply line for feeding fuel to the dispenser 10 can also be based on a detected pressure of the fuel being fed to the fuel tank via a pressure sensor that is positioned to detect or monitor a pressure of the vehicle fuel tank. For example, the pressure that is detected can indicate that the pressure drop for feeding the fuel to the dispenser may need to be reduced via the additional use of a supply line 13 to help trigger actuation of the supply line adjustment in addition to the temperature detected by the third temperature sensor T3.

In response to the subsequent detection of the dispensing feed temperature being at or below the first pre-selected fueling temperature, yet another additional supply line (or set of supply lines) can be opened for feeding fuel to the dispenser. This adding of another additional supply line 13 (or set of supply lines 13) can further reduce the overall pressure drop associated with feeding the fuel to the dispenser 10, which can also help further accommodate the flow of fuel into the fuel tank via the dispenser 10 since the fuel tank is now fuller and at another higher pressure due to the filling that previously occurred using only the first, second, and third supply lines 13 that were previously utilized in fueling in the above discussed sequential manner. The added fourth supply line may again have warmer fuel therein prior to the opening of the inlet and outlet valves of the added supply line since that stored fuel in the supply line may warm as it is within the supply line 13 between closed inlet and outlet valves and this may increase the temperature of the fuel being fed to the dispenser that can be detected via the third temperature sensor T3. As the fuel is fed to the dispenser via the newly opened additional supply line as well as the first, second, and third supply lines that were previously used and are still being used for conveying fuel to the dispenser 10, the warmer fuel from within the newly opened supply line 13 can result in the temperature of the fuel fed to the dispenser increasing back above first pre-selected fueling temperature. As the newly opened supply line 13 receives colder fluid output from the compression system 5 (after being vaporized via the fueling heat exchanger 7), the fluid being fed to the dispenser 10 will thereafter continue to decrease in temperature until the fuel fed via the opened supply lines 13 again falls to the first pre-selected fueling temperature or a lower temperature.

As also noted above, in some embodiments, the triggering of the use of the fourth supply line 20 for adding use of another supply line for feeding fuel to the dispenser 10 can also be based on a detected pressure of the fuel being fed to the fuel tank via a pressure sensor that is positioned to detect or monitor a pressure of the vehicle fuel tank. For example, the pressure that is detected can indicate that the pressure drop for feeding the fuel to the dispenser may need to be reduced via the additional use of a supply line 13 to help trigger actuation of the supply line adjustment in addition to the temperature detected by the third temperature sensor T3.

The sizing of the different supply lines 13 can be similar or can be different. In some embodiments, the first supply line 14 may be larger or smaller than the other supply lines 13 that may be opened in a sequential order for fueling. For example, the first supply line 14 can be sized to provide a greater quantity of fuel to the dispenser than the second supply line 16 or can be sized to provide a lesser quantity of fuel to the dispenser than the second supply line 16 (e.g. a diameter of the first supply line may be greater or smaller than the diameter of the second supply line). For instance, in some implementations, a smaller first supply line may facilitate quicker cooling of the supply line for feeding fuel to the dispenser at a first pre-selected temperature and the larger second supply line that may be sequentially opened during fueling may then provide a larger warming effect during the opening and initial feeding of fuel via that opened larger second supply line 16 and the added warmer fuel being fed to the dispenser with the fuel of the first supply line 14. In other instances, a larger first supply line 14 can facilitate a slower cooling of the supply line for feeding fuel to the dispenser at a first pre-selected temperature, but the smaller second supply line that may be sequentially opened during fueling may then provide a smaller warming effect during the opening and initial feeding of fuel via that opened second supply line 16.

Such factors can also be design considerations for the other supply lines 13 (e.g. third supply line 18, fourth supply line 20). For example, the third supply line 18 can have similar sizing to the second supply line 16 or can be sized to provide a larger quantity of fuel or a smaller quantity of fuel as compared to the second supply line 16. As another example, the fourth supply line 20 can have similar sizing to the second supply line 16 or can be sized to provide a larger quantity of fuel or a smaller quantity of fuel as compared to the second supply line 16. In some configurations, all the supply lines 13 may have different sizing for providing different quantities of fuel. In other embodiments, some of the supply lines 13 can have similar sizing while others are larger or smaller sized supply lines. In yet other embodiments, all the supply lines 13 can have similar sizing.

The sizing of the supply lines 13 can be provided so that the sizing of the first supply line as well as the other supply lines 13 can permit the first supply line 14 to be sufficiently cooled down while also providing fuel to the dispenser after a compression system cool down operation so that the temperature of the fuel fed to the dispenser 10 is at or below a fueling ceiling temperature limit for the fuel (e.g. a pre-selected maximum temperature for fuel to be fed to the dispenser). This fueling ceiling temperature limit can be the same temperature as the second pre-selected fueling temperature that is higher than the first pre-selected fueling temperature or may be another temperature that is higher than the second pre-selected fueling temperature.

In some embodiments, the inlet and outlet valves of the supply lines can have a proportionally greater impact on the fuel temperature at the dispenser 10. This can be particularly true in situations where the supply lines have a relatively large diameter or volume since a larger volume of fuel (e.g. hydrogen gas, etc.) is then being mixed with the smaller reservoir of colder gas from the first supply line 14 after other supply lines are opened in a sequential manner. Depending upon the size of the subsequent supply line to be opened, it may be necessary to control the amount of warm gas that is used in this mixing via the opening of the additional supply line 13. Rather than just fully opening the inlet and outlet valves V of the supply line, the valves V can be modulating valves and the opening of the new supply line can occur in a more modular fashion by a pre-selected staged opening of the valves V of the new supply line to be opened. For example, the valves can be initially opened to a position for feeding 10% to 20% of the full flow rate of fuel that can be provided when the valve is fully opened and may be subsequently further opened to a fully opened position so that such opening of the valves occur in accordance with a pre-defined valve opening scheme that can account for the sizing of the supply line and how much the gas being supplied via the newly opened supply line may alter the temperature of the fuel being fed to the dispenser 10. This modulation of the opening of the valves of the supply line can occur so that the temperature of the fuel measured via the third temperature sensor T3 is at or below a pre-selected fueling ceiling temperature limit. As noted above, this temperature limit can be the same temperature as the second pre-selected fueling temperature that is higher than the first pre-selected fueling temperature or may be another temperature that is higher than the second pre-selected fueling temperature. The controller that may communicate with the valves to trigger opening of the valves can control how such valves V are opened so that they are adjusted from fully closed to a fully open position so that the valves are gradually adjusted to an open position in a way that accounts for how the warmer fuel within the previously closed supply line may affect the temperature of the fuel being fed to the dispenser 10 so that the temperature of the fuel detected via the third temperature sensor T3 stays at or below the pre-selected fueling ceiling temperature.

Some embodiments of the sequential use of supply lines 13 for fueling can be performed in which there is more than four sets of supply lines 13 that are opened in a sequential manner for increasing the number of supply lines used for supplying fuel to the dispenser during a fueling operation. Other embodiments may utilize less than four supply lines in sequential opening of the supply lines 13 (e.g. there may just be a sequential opening of first and second supply lines 14 and 16, or first, second, and third supply lines 14, 16 and 18) for increasing the number of supply lines utilized during fueling. We have found that embodiments can facilitate an improved rapidity in fueling that can also provide an acceptable fueling temperature for the fuel fed to the dispenser as well as accommodating larger pressure drops that can occur when less supply lines are used that can accommodate the pressure condition in a vehicle fuel tank and can be sequenced to correspond with different vehicle fuel tank levels (e.g. use of a single supply line 13 when the tank is empty and at a low pressure, and sequential adding of additional supply lines 13 to reduce the pressure drop for conveying of fuel as the pressure of the vehicle fuel tank can increase as it is filled with the fuel received from the dispenser 10). We have found that embodiments can be particularly helpful at speeding up the fueling process when supply lines 13 are very long (e.g. over 10 meters long, over 20 meters long, between 20 and 50 meters long, etc.) and/or there are a relatively large number of supply lines 13 (e.g. at least four supply lines 13, etc.).

A controller 40 can be communicatively connected to the third temperature sensor T3, which can also be considered a dispenser fuel temperature sensor or a dispenser fuel feed temperature sensor, as well as the inlet and outlet valves of the different supply lines 13. In embodiments that also may utilize a detected pressure for triggering sequential adding of additional supply lines, the controller 40 can also be communicatively connected to the pressure sensor as well.

The controller 40 can be configured to detect the dispensing feed temperature being at or below the first pre-selected fueling temperature for triggering opening of the inlet and outlet valves of a new supply line 13 for use of that additional supply line for fueling as the fueling continues (as well as the pressure sensor for embodiments that may also utilize pressure detection to help trigger the use of additional supply lines). The controller 40 can communicate with the inlet and outlet valves of a supply line 13 to open those valves in response to the dispensing feed temperature detected by the third temperature sensor T3 being at or below the first pre-selected fueling temperature, for example. In some embodiments, the controller 40 utilized for the sequential opening of supply lines 13 for fueling can be the same controller utilized for controlling operations of the cooling down of the compression system 5 and conduits used to help supply fuel to the dispenser 10 (e.g. the first controller CTRL1). In other embodiments, the first controller CTRL1 can control the compression system cool down process and a second controller CTRL2 (shown in broken line in FIG. 1) can be communicatively connected to the third temperature sensor T3 (as well as the pressure sensor for some embodiments that may also utilize a detected pressure as noted above) and the inlet and outlet valves V of the supply lines 13 for controlling the sequential supply line opening process for providing fuel to the dispenser 10 in a more rapid fashion.

Also, after fueling is completed, the controller 40 can be configured to actuate closing of all the inlet and outlet valves V of the supply lines 13 and/or all but one of the supply lines 13 such that there is only a single supply line 13 or set of supply lines 13 open and available for use in the initial compression system cool down process for initiating a new fueling in the future. The closing of the valves for the other supply lines 13 can also hep avoid loss of fuel that is present within those supply lines after fueling has completed and a vehicle fuel tank is full.

Another example of a process that can utilize a sequential use of supply lines 13 for fueling is illustrated in FIG. 3. In a first step ST1, after the compression system 5 is at a pre-selected operational temperature (e.g. via detection of a temperature of the first temperature sensor T1 as discussed above), at least one compressor of the compression system 5 can be actuated to turn it on and initiate its operation to feed fuel to a dispenser 10 for feeding the fuel to one or more vehicle fuel tank so that only a first supply line 14 of a plurality of supply lines 13 is utilized for the initial feeding of the fuel 13. This same first supply line 14 can be the only supply line 13 or set of supply lines utilized for the compression system cool down processing in which the second vent conduit 24 can be utilized as well.

Thereafter, a sequential use of additional supply lines 13 for conveying fuel to the dispenser 10 can be provided via a second step ST2. This second step ST2 can include one or more sub-steps as indicated in FIG. 2. A controller communicatively connected to the third temperature sensor T3 and inlet and outlet valves of supply lines 13 can be utilized to detect a suitable condition or set of conditions for opening of inlet and outlet valves for sequentially adding supply lines 13 for conveying the fuel to the dispenser 10. This detection can also occur in some embodiments based on a detected pressure of a fuel tank being filled via a pressure sensor that can be communicatively connected to the controller in some embodiments as noted above as well.

For instance, in a first sub-step ST2A of the second step ST2, after the dispenser feed conduit temperature is detected as being at or below a first pre-selected fueling temperature threshold, the inlet and outlet valves V7*a* and V7*b* of the second supply line 16 can be opened for feeding fuel to the vehicle fuel tank so that the dispenser 10 receives fuel conveyed through both the first and second supply lines 14 and 16 for continued fueling. The triggering of the opening of these valves can also be based on a detected pressure in some embodiments while other embodiments may not utilize a detected pressure to facilitate the opening of these valves. And the opening of these valves V can occur such that the valves are quickly adjusted from closed to open positions or are modulated in a more pre-selected adjustment scheme from a fully closed position to a fully open position to account for a pre-selected fueling ceiling temperature as discussed above. As noted above, the opening of these valves can result in warm fuel within the second supply line 16 being mixed with colder fuel fed to the dispenser feed conduit 22 such that the temperature of the fuel may warm to be above the first pre-selected fueling temperature threshold. The pressure drop associated with conveying the fuel to the dispenser 10 may also be decreased via the use of the multiple supply lines as noted above.

In a second sub-step ST2B of the second step ST2, after the dispenser feed conduit temperature is detected as being at or below the first pre-selected fueling temperature threshold, the inlet and outlet valves V6*a* and V6*b* of the third supply line 18 can be opened for feeding fuel to the vehicle fuel tank so that the dispenser 10 receives fuel conveyed through the first, second, and third supply lines 14, 16 and 18 for continued fueling. The triggering of the opening of these valves can also be based on a detected pressure in some embodiments while other embodiments may not utilize a detected pressure to facilitate the opening of these valves. And the opening of these valves V can occur such that the valves are quickly adjusted from closed to open positions or are modulated in a more pre-selected adjustment scheme from a fully closed position to a fully open position to account for a pre-selected fueling ceiling temperature as discussed above. As noted above, the opening of these valves can result in warm fuel within the third supply line 18 being mixed with colder fuel fed to the dispenser feed conduit 22 via the first and second supply lines 14, 16 such that the temperature of the fuel may warm to be above the first pre-selected fueling temperature threshold. The pressure drop associated with conveying the fuel to the dispenser 10 may also be decreased via the use of the additional third supply line 18 as well.

In some embodiments of the process, the fueling may then be completed. After completion, the process can include a third step in which valves V of the supply lines 13 are closed such that only a single supply line is available for use in performance of a compression system cool down operation and/or a new fueling operation for filling another vehicle's fuel tank via the dispenser 10.

In other embodiments, the process can include yet additional sub-steps of adding use of other supply lines. For example, in a third sub-step ST2C of the second step ST2, after the dispenser feed conduit temperature is detected as being at or below the first pre-selected fueling temperature threshold, the inlet and outlet valves V5*a* and V5*b* of the fourth supply line 20 can be opened for feeding fuel to the vehicle fuel tank so that the dispenser 10 receives fuel conveyed through the first, second, third, and fourth supply lines 14, 16, 18 and 20 for continued fueling. The triggering of the opening of these valves can also be based on a detected pressure in some embodiments while other embodiments may not utilize a detected pressure to facilitate the opening of these valves. And the opening of these valves V can occur such that the valves are quickly adjusted from closed to open positions or are modulated in a more pre-selected adjustment scheme from a fully closed position to a fully open position to account for a pre-selected fueling ceiling temperature as discussed above. As noted above, the opening of these valves can result in warm fuel within the fourth supply line 20 being mixed with colder fuel fed to the dispenser feed conduit 22 via the first, second, and third supply lines 14, 16, 18 such that the temperature of the fuel may warm to be above the first pre-selected fueling temperature threshold. The pressure drop associated with conveying the fuel to the dispenser 10 may also be decreased via the use of the additional fourth supply line 20 as well.

In some embodiments of the process, the fueling may then be completed after this third sub-step ST2C. After completion, the process can include a third step in which valves V of the supply lines 13 are closed such that only a single supply line is available for use in performance of a compression system cool down operation and/or a new fueling operation for filling another vehicle's fuel tank via the dispenser 10.

In yet other embodiments, the process may include yet one or more additional sub-steps. For example, in a fourth sub-step ST2D of the second step ST2, after the dispenser feed conduit temperature is detected as being at or below the first pre-selected fueling temperature threshold, the inlet and outlet valves of the yet another supply line 13 can be opened for feeding fuel to the vehicle fuel tank so that the dispenser 10 receives fuel conveyed through the first, second, third, and fourth supply lines 14, 16, 18 and 20 as well as this additional other supply line for continued fueling. The triggering of the opening of these valves can also be based on a detected pressure in some embodiments while other embodiments may not utilize a detected pressure to facilitate the opening of these valves. And the opening of these valves V can occur such that the valves are quickly adjusted from closed to open positions or are modulated in a more pre-selected adjustment scheme from a fully closed position to a fully open position to account for a pre-selected fueling ceiling temperature as discussed above. As noted above, the opening of these valves can result in warm fuel within the additional supply line 13 being mixed with colder fuel fed to the dispenser feed conduit 22 via the first, second, third and fourth supply lines 14, 16, 18, 20 such that the temperature of the fuel may warm to be above the first pre-selected fueling temperature threshold. The pressure drop associated with conveying the fuel to the dispenser 10 may also be decreased via the use of the additional supply line 13 as well.

In some embodiments of the process, the fueling may then be completed after this fourth sub-step ST2D. After completion, the process can include a third step in which valves V of the supply lines 13 are closed such that only a single supply line is available for use in performance of a compression system cool down operation and/or a new fueling operation for filling another vehicle's fuel tank via the dispenser 10.

As may be appreciated from the above, yet other embodiments may utilize other additional sub-steps for further sequential adding of supply lines 13. As noted above, a controller 40 can be communicatively connected to the sensor(s) and valves V of the supply lines for opening the valves based on the detected temperature (and in some embodiments also a detected pressure). The controller 40 can be the same controller utilized to control operations of a compressions system cool down for venting of fuel during the cool down operation or can be a different controller such that each process has a specific controller 40 designated for monitoring and control of those operations.

We have found that embodiments of our apparatus, process, and control system can facilitate fueling operations to be initiated within 30 seconds of the time a nozzle of a dispenser is connected to a vehicle for feeding fuel to the fuel tank of the vehicle. In some embodiments, the start-up time can occur in less than 20 seconds, but more than 0 seconds. This advantage can be provided by use of an embodiment of our compression system cool down scheme, use of the sequential opening of supply lines 13, or a combination of both of these schemes.

We have also found that the fueling process can occur more rapidly. For example, the sequential utilization of the supply lines 13 has been found to permit the flow rate of fuel fed to the dispenser 22 to be increased to provide for a faster fueling process. This rapidity can be further enhanced via use of an embodiment of the compression cool down process.

Also, embodiments can be utilized that can allow compression system cool down operations to occur without needing use of additional heat transfer fluids or cooling circuits that may utilize other heat transfer fluids. Moreover, embodiments can provide a substantial reduction in the loss of fuel to venting. Some embodiments can permit a reduction in venting of fuel by as much as 90% as compared to conventional cool down processes, which can provide substantial cost savings, greatly reduce any environmental impact that can be associated with the venting of the fuel, and greatly improve operational flexibility (e.g. require less refilling of the fuel storage tank 3, etc.).

It should be appreciated that modifications to the apparatus 1 for fuel dispensing, a control system for fuel dispensing, a process for fuel dispensing, and methods of making and using the same can be made to meet a particular set of criteria for different embodiments of the apparatus 1 or process. For instance, the size, shape and thickness supply lines 13 and vent conduits can be adapted to accommodate a particular set of design criteria. As another example, the compression system and number of compressors or pumps utilized in the compression system can be adapted for a particular installation situation. As yet another example, the type of valves V that are utilized (e.g. control, modulating, etc.) and size can also be any suitable arrangement for meeting a particular set of design criteria. As yet another example, while the fuel for the dispensers 10 stored in the fuel storage tank 3 can be hydrogen, it is also possible that the fuel may be another suitable fuel. As yet another example, the size and configuration of the fuel storage tank 3, buffer tank(s) 9, dispenser 10, venting heater 11 and/or fueling heat exchanger 7 can be any of a number of suitable options that may have any of a number of suitable sizes for meeting a pre-selected set of design criteria.

As yet another example, embodiments of the apparatus 1 and process can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus or process as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a process, an apparatus, a system, and methods of making and using the same have been shown and described above, it is to be distinctly understood that the invention is not limited thereto but may be otherwise variously embodied and practiced within the scope of the following claims.

What is claimed is:

1. A process for supplying fuel from a fuel storage tank to a dispenser, comprising:

feeding fuel stored in the fuel storage tank to a compression system for undergoing compression and subsequently being fed to a heat exchanger to vaporize the fuel so that the fuel is gaseous;

feeding the gaseous fuel to a first supply line of a plurality of supply lines for passing the gaseous fuel to a dispenser for dispensing to a fuel tank of a vehicle via a dispenser feed conduit connected to the supply lines;

in response to determining that a temperature of the gaseous fuel being fed to the dispenser is at or below a first pre-selected fueling temperature, opening a second supply line of the supply lines to feed the gaseous fuel to the dispenser feed conduit via the first supply line and the second supply line; and passing the gaseous fuel output from the first supply line and the second supply line to the dispenser via the dispenser feed conduit.

2. The process of claim 1, wherein the fuel is hydrogen and/or wherein the first supply line is sized to provide a greater quantity of fuel to the dispenser than the second supply line or the first supply line is sized to provide a lesser quantity of fuel to the dispenser than the second supply line.

3. The process of claim 1, comprising:

after the opening of the second supply line has occurred and in response to determining that the temperature of the gaseous fuel being fed to the dispenser is at or below the first pre-selected fueling temperature, opening a third supply line of the supply lines to feed the gaseous fuel to the dispenser feed conduit via the first supply line, the second supply line, and the third supply line, wherein a temperature of the gaseous fuel being fed to the dispenser is increased above the first pre-selected fueling temperature after the third supply line is opened; and passing the gaseous fuel output from the first supply line, the second supply line, and the third supply line to the dispenser via the dispenser feed conduit after the third supply line was opened and the temperature of the gaseous fuel was increased above the first pre-selected fueling temperature such that the temperature of the gaseous fuel is reduced to the first pre-selected fueling temperature.

4. The process of claim 1, wherein the opening of the second supply line includes opening an inlet valve of the second supply line and opening an outlet valve of the second supply line.

5. The process of claim 4, wherein the inlet valve of the second supply line is a modulating valve and/or the outlet valve of the second supply line is a modulating valve.

6. The process of claim 1, comprising:

in response to detecting a demand for fuel at the dispenser, adjusting valves so that fluid from the fuel storage tank is passable to the compression system while the compression system is deactivated to cool the compression system to a pre-selected compression system operational temperature threshold.

7. The process of claim 6, wherein the adjusting of the valves includes:

keeping a first vent valve of a first vent conduit closed and opening a second vent valve of a second vent conduit downstream of the supply lines open so that fluid from the fuel storage tank is passable from the compression system to the first supply line via a bypass conduit positioned between the first supply line and the compression system so that the fueling heat exchanger is bypassable for passing the fluid to the first supply line; and in response to determining that a temperature of the fluid adjacent the second vent valve is at a first pre-selected temperature threshold, closing the second vent valve and the bypass conduit and opening the first vent valve to stop venting of the fluid via the second vent conduit and initiate venting of the fluid via the first vent conduit;

in response to determining that the temperature of the fluid adjacent the second vent valve is at a second pre-selected temperature threshold that is higher than the first pre-selected temperature threshold, closing the first vent valve and opening the bypass conduit and opening the second vent valve to stop venting of the fluid via the first vent conduit and initiate venting of the fluid via the second vent conduit.

8. The process of claim 7, comprising:

in response to determining that the compression system is at or below the pre-selected compression system operational temperature threshold, closing of the first vent valve and/or the second vent valve and closing of the bypass conduit and subsequently starting the compression system for feeding of the fuel within the fuel storage tank to the fueling heat exchanger to vaporize the fuel to form the gaseous fuel.

9. The process of claim 1, wherein a temperature of the gaseous fuel being fed to the dispenser is increased above the first pre-selected fueling temperature after the second supply line is opened; and wherein the passing the gaseous fuel output from the first supply line and the second supply line to the dispenser via the dispenser feed conduit occurs such that the temperature of the gaseous fuel is reduced to the first pre-selected fueling temperature after the temperature of the gaseous fuel increased above the first pre-selected fueling temperature.

10. An apparatus for fueling a fuel tank of a vehicle, comprising:

a fuel storage tank configured to store fuel therein, the fuel comprising fuel in a liquid state;

a compression system in fluid communication with the fuel storage tank for pressurization of the fuel for outputting the fuel towards a dispenser configured to fill the fuel tank of the vehicle with the fuel;

a fueling heat exchanger; and a plurality of supply lines including a first supply line and a second supply line, the fueling heat exchanger positioned between the supply lines and the compression system to vaporize the fuel output from the compression system so that the fuel in a gaseous state is feedable to one or more of the supply lines for feeding to the dispenser;

a dispenser feed conduit positioned between the supply lines and the dispenser for feeding the fuel in the gaseous state output from the one or more supply lines to the dispenser;

a temperature sensor positioned to determine a temperature of the fuel in the gaseous state being fed to the dispenser via the dispenser feed conduit;

a first controller having a processor communicatively connected to a non-transitory computer readable medium, the first controller communicatively connected to the temperature sensor and valves of the second supply line; and the first controller configured to detect a temperature of the fuel in the gaseous state being fed to the dispenser via the first supply line based on temperature data received via the temperature sensor and, in response to determining that the temperature of the gaseous fuel being fed to the dispenser via the first supply line is at or below a first pre-selected fueling temperature, communicate with the valves of the second supply line to open the second supply line so the fuel in the gaseous state outputtable from the fueling heat exchanger is feedable to the dispenser feed conduit via the first supply line and the second supply line.

11. The apparatus of claim 10, wherein a temperature of the fuel in the gaseous state being fed to the dispenser is increasable to a second pre-selected fueling temperature that is higher than the first pre-selected fueling temperature after the second supply line is opened and the first controller is also configured to:

determine that the temperature of the gaseous fuel is reduced to the first pre-selected fueling temperature after the second supply line is opened and, in response to determining that the temperature of the gaseous fuel is reduced to the first pre-selected fueling temperature after the second supply line is opened, communicate with valves of a third supply line of the supply lines to open the third supply line so that the fuel in the gaseous state outputtable from the fueling heat exchanger is feedable to the dispenser feed conduit via the first supply line, the second supply line and the third supply line.

12. The apparatus of claim 11, wherein the valves of the second supply line include an inlet valve of the second supply line and an outlet valve of the second supply line, the inlet valve of the second supply line being a modulating valve and/or the outlet valve of the second supply line being a modulating valve.

13. The apparatus of claim 10, wherein the fuel comprises hydrogen and/or wherein the first supply line is sized to provide a greater quantity of fuel to the dispenser than the second supply line or the first supply line is sized to provide a lesser quantity of fuel to the dispenser than the second supply line.

14. The apparatus of claim 10, comprising:

a first vent conduit positioned between the compression system and the fueling heat exchanger;

a second vent conduit connected to the dispenser feed conduit; and a bypass conduit positioned between the compression system and the first supply line so that fluid outputtable from the compression system is passable to the first supply line while bypassing the fueling heat exchanger.

15. The apparatus of claim 14, comprising:

a second controller having a processor communicatively connected to a non-transitory computer readable medium, the second controller configured so that in response to detecting a demand for fuel at the dispenser, valves of the first vent conduit, the second vent conduit, and the bypass conduit are adjusted so that fluid from the fuel storage tank is passable to the compression system while the compression system is deactivated to cool the compression system to a pre-selected compression system operational temperature threshold.

16. The apparatus of claim 15, wherein the valves of the first vent conduit, the second vent conduit, and the bypass conduit are adjusted such that:

a first vent valve of the first vent conduit is closed, a valve of the bypass conduit is opened, and a second vent valve of the second vent conduit is opened so that fluid from the fuel storage tank is passable from the compression system to the first supply line via the bypass conduit so that the fueling heat exchanger is bypassable for passing the fluid to the first supply line; and in response to determining that a temperature of the fluid adjacent the second vent valve is at a first pre-selected temperature threshold, the second vent valve is closed and the valve of the bypass conduit is closed and the first vent valve is opened to stop venting of the fluid via the second vent conduit and initiate venting of the fluid via the first vent conduit; and in response to determining that the temperature of the fluid adjacent the second vent valve is at a second pre-selected temperature threshold that is higher than the first pre-selected temperature threshold, the first vent valve is closed and the valve of the bypass conduit is opened and the second vent valve is opened to stop venting of the fluid via the first vent conduit and initiate venting of the fluid via the second vent conduit.

17. The apparatus of claim 14, wherein the first controller is also configured so that in response to detecting a demand for fuel at the dispenser, valves of the first vent conduit, the second vent conduit, and the bypass conduit are adjusted so that fluid from the fuel storage tank is passable to the compression system while the compression system is deactivated to cool the compression system to a pre-selected compression system operational temperature threshold.

18. The apparatus of claim 17, wherein the valves of the first vent conduit, the second vent conduit, and the bypass conduit are adjusted such that:

a first vent valve of the first vent conduit is closed, a valve of the bypass conduit is opened, and a second vent valve of the second vent conduit is opened so that fluid from the fuel storage tank is passable from the compression system to the first supply line via the bypass conduit so that the fueling heat exchanger is bypassable for passing the fluid to the first supply line;

in response to determining that a temperature of the fluid adjacent the second vent valve is at a first pre-selected temperature threshold, the second vent valve is closed and the valve of the bypass conduit is closed and the first vent valve is opened to stop venting of the fluid via the second vent conduit and initiate venting of the fluid via the first vent conduit; and in response to determining that the temperature of the fluid adjacent the second vent valve is at a second pre-selected temperature threshold that is higher than the first pre-selected temperature threshold, the first vent valve is closed and the valve of the bypass conduit is opened and the second vent valve is opened to stop venting of the fluid via the first vent conduit and initiate venting of the fluid via the second vent conduit.

19. A control system for an apparatus for fueling a fuel tank of a vehicle, the control system comprising:

a first controller having a processor communicatively connected to a non-transitory computer readable medium, the first controller communicatively connected to a temperature sensor positioned to determine a temperature of fuel in a gaseous state being fed to a dispenser via a dispenser feed conduit and valves of at least a second supply line of a plurality of supply lines that includes a first supply line and the second supply line; and the first controller configured to detect a temperature of the fuel in the gaseous state being fed to the dispenser via the first supply line based on temperature data received from the temperature sensor and, in response to determining that the temperature of the gaseous fuel being fed to the dispenser via the first supply line is at or below a first pre-selected fueling temperature, communicate with the valves of the second supply line to open the second supply line so the fuel in the gaseous state outputtable from the fueling heat exchanger is feedable to the dispenser feed conduit via the first supply line and the second supply line.

20. The control system of claim 19, comprising:

a second controller having a processor communicatively connected to a non-transitory computer readable medium, the second controller communicatively connected to valves of a first vent conduit, a second vent conduit, and a bypass conduit, the first vent conduit fluidly connected to a compression system to vent fluid output from the compression system while the compression system is deactivated, the second vent conduit being connected to the dispenser feed conduit downstream of the supply lines and the first vent conduit, the bypass conduit being positioned between first vent conduit and the supply lines to that fluid passed through the bypass conduit avoids being passed through a fueling heat exchanger positioned between a compression system and the supply lines; and the second controller configured so that in response to detecting a demand for fuel at the dispenser, the valves of the first vent conduit, the second vent conduit, and the bypass conduit are adjusted so that fluid from the fuel storage tank is passable to the compression system while the compression system is deactivated to cool the compression system to a pre-selected compression system operational temperature threshold.

* * * * *